United States Patent [19]

Arai et al.

[11] Patent Number: 4,886,860

[45] Date of Patent: Dec. 12, 1989

[54] POLYMETALOSILAZANE AND PROCESS FOR PREPARING SAME

[75] Inventors: Mikiro Arai; Osamu Funayama; Yuuji Tashiro, all of Saitama; Takeshi Isoda, Niiza, all of Japan

[73] Assignee: Toa Nenryo Kogyo Kabushiki Kaisha, Tokyo, Japan

[21] Appl. No.: 326,399

[22] Filed: Mar. 17, 1989

Related U.S. Application Data

[63] Continuation of Ser. No. 172,019, Mar. 23, 1988, abandoned.

[51] Int. Cl.$^4$ ............................................. C08F 283/00
[52] U.S. Cl. ..................................... 525/474; 528/28; 528/33; 528/38; 525/475
[58] Field of Search .................. 525/475, 474; 528/38, 528/28, 33

[56]  References Cited

U.S. PATENT DOCUMENTS

| | | | |
|---|---|---|---|
| 4,482,669 | 11/1984 | Seyferth et al. | 528/28 |
| 4,659,850 | 4/1987 | Arai et al. | 528/21 |
| 4,720,532 | 1/1988 | Seyferth et al. | 528/38 |
| 4,730,026 | 3/1988 | Bolt et al. | 525/475 |

FOREIGN PATENT DOCUMENTS

| | | |
|---|---|---|
| 56-74126 | 6/1981 | Japan . |
| 56-92923 | 7/1981 | Japan . |
| 60-145903 | 8/1985 | Japan . |
| 60-226890 | 12/1985 | Japan . |
| 61-89230 | 5/1986 | Japan . |

OTHER PUBLICATIONS

D. Seyferth et al., "A Liquid Silazane Precursor to Silicon Nitride", Communications of Am. Ceram. Soc., C-13, Jan. 1983.

D. Seyferth et al., Polym. Prepr., Am. Chem. Soc., Div. Polym. Chem., 25, 10 (1984).

D. Seyferth et al., Communication of Am. Ceram. Soc., C-132, Jul. 1984.

Primary Examiner—Melvyn I. Marquis
Attorney, Agent, or Firm—Michael N. Meller

[57] ABSTRACT

A novel polymetalosilazane having a metal/silicon atomic ratio of from 0.001 to 3 and a number average molecular weight of about 200 to 500,000 is prepared by a process comprising: reacting a polysilazane having a number average molecular weight of about 100 to 500,000, which has a skelton consisting substantially of units

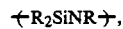

at least one R being hydrogen, with a metal alkoxide in which the metal is selected from metals of the groups IIA and III to V of the Periodic Table.

29 Claims, 18 Drawing Sheets

POLYMETALOSILAZANE AND PROCESS FOR PREPARING SAME

This application is a continuation of application Ser. No. 172,019, filed Mar. 23, 1988, now abandoned.

BACKGROUND OF THE INVENTION

(1) Field of the Invention

The present invention relates to a novel polymetalosilazane and a process for the preparation thereof. Silicon-metal-nitrogen-oxygen or silicon-metal-nitrogen-oxygen-carbon ceramics formed by using this polymetalosilazane as the precursor are valuable as heat-resistant high-hardness materials and reinforcing materials for composite materials, and it is considered that these ceramics will be widely utilized in the fields of chemical, metal, aerial, space, precision machinery and automobile industries.

(2) Description of the Related Art

A polymetalosilazane having a silicon-oxygen-metal linkage and/or the structure in which a nitrogen atom and a metal alkoxide are condensed together has not been known.

As the analogous compound, there are known a polytitanocarbosilane prepared by reacting polycarbosilane with a titanium alkoxide and a polyzirconocarbosilane prepared by reacting polycarbosilane with an organozirconium compound (Japanese Unexamined Patent Publication No. 56-74126 and Japanese Unexamined Patent Publication No. 56-92923).

Furthermore, various perhydropolysilazanes and polyorgano(hydro)silazanes prepared by reacting halosilanes with ammonia (Japanese Unexamined Patent Publication No. 60-145903, D. Seyferth et al., "A Liquid Silazane Precursor To Silicon Nitride", Communications of Am. Ceram. Soc., January 1983, Japanese Unexamined Patent Publication No. 60-226890 and Japanese Unexamined Patent Publication No. 61-89230) have been reported.

Ceramics of the Si-M-C-O system (in which M stands for Ti or Zr) obtained by using the polytitano-carbosilane or polyzirconosilane as the precursor contain a free carbon atom. Since this free carbon has a high reactivity with a molten metal such as aluminum and causes degradation of the strength, satisfactory characteristics cannot always be obtained when composite materials are prepared from these ceramics and metals.

Furthermore, when silicon nitride ceramics derived from the polysilazanes are utilized in the form of composite materials with metals, there is a problem of an unsatisfactory affinity with metals.

If these defects are overcome, the utility thereof as a heat-resistant high-hardness material or composite material will be highly improved.

DETAILED DESCRIPTION OF THE INVENTION

Figure 1:
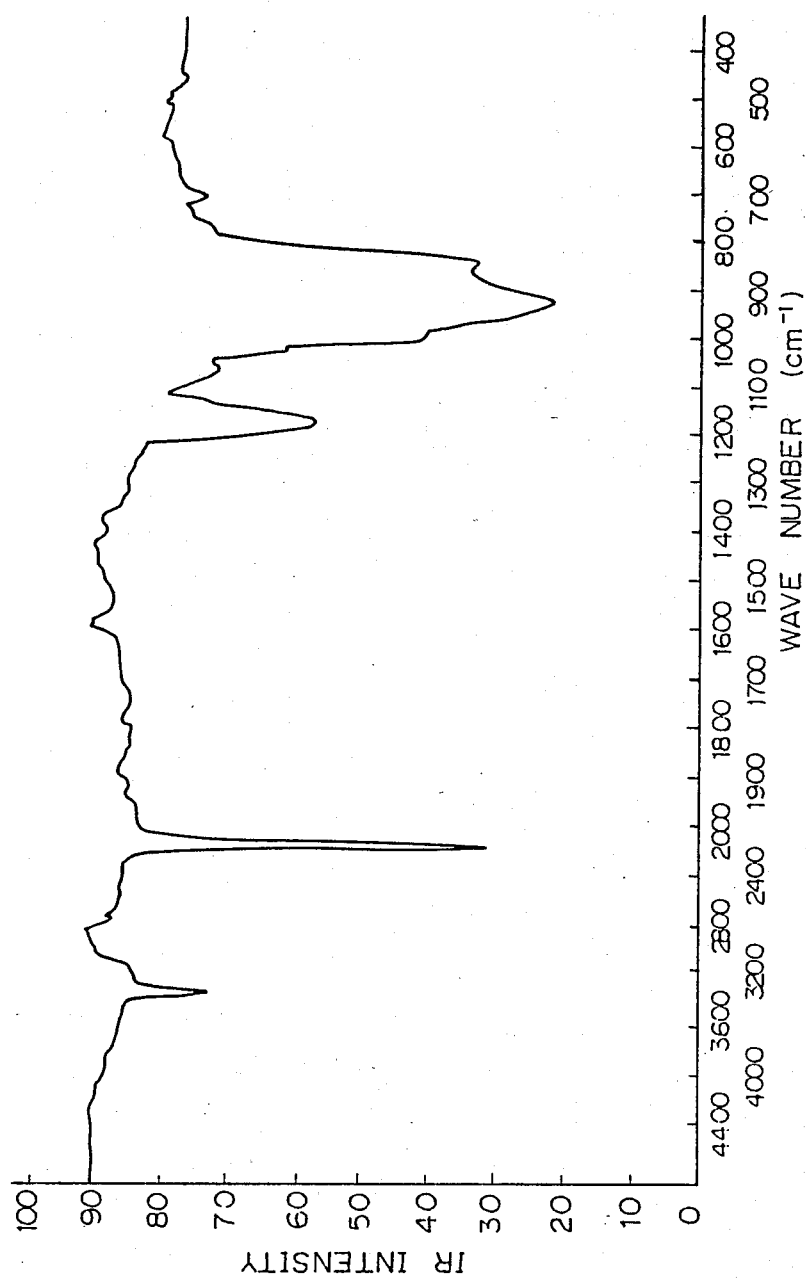
FIGS. 1 and 2 are IR spectrum and $^1$HNMR spectrum of the perhydropolysilazane in Example 1.

The present invention solves the above-mentioned problems by providing a novel polymetalosilazane and a process for the preparation thereof.

In accordance with the present invention, there are provided novel polymetalosilazanes having a metal/silicon atomic ratio of 0.001 to 3 and a number average molecular weight of about 200 to about 500,000, which is obtained by reacting polysilazanes having a number average molecular weight of about 100 to about 50,000, which has a main skeleton consisting essentially of units represented by the following general formula (I):

wherein R$^1$, R$^2$ and R$^3$ independently stand for a hydrogen atom, an alkyl group, an alkenyl group, a cycloalkyl group, an aryl group, a group other than the above-mentioned groups, in which the group bonded directly to the silicon atom is a carbon atom, an alkylsilyl group, an alkylamino group or an alkoxy group, with the proviso that at least one of R$^1$, R$^2$ and R$^3$ is a hydrogen atom, with a metal alkoxide represented by the following general formula (II):

M(OR$^4$)hd n          (II)

wherein M stands for at least one metal selected from the group consisting of metals of groups IIA and III through V of the Periodic Table, R$^4$'s which may be the same or different stand for a hydrogen atom or an alkyl group having 1 to 20 carbon atom or aryl group with the proviso that at least one of R$^4$'s is the above-mentioned alkyl group or aryl group, and n stands for the valency of the metal M.

The novel polymetalosilazane provided according to the present invention is a compound characterized in that hydrogen atoms bonded to at least a part of the silicon atoms in the main skeleton of the polysilazane and/or hydrogen atoms bonded to nitrogen atoms are reacted with a metal alkoxide and the polymetalosilazane has a side chain group or circular or crosslinked structure formed by condensation of said silicon atoms and/or nitrogen atoms with the metal alkoxide.

In the reaction between the Si-H bond of the polysilazane and the metal alkoxide, the organic group ($R_4$ metal alkoxide [$M(OR^4)_n$]) extracts the hydrogen atom of the Si-H bond and the formed $R^4H$ is isolated, whereby the Si-O-M linkage is formed as follows:

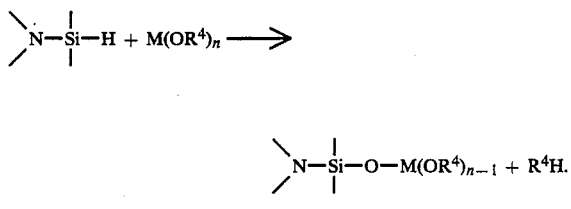

In the reaction between the N—H bond of the polysilazane and the metal alkoxide, the hydrogen atom of the N—H bond is extracted and the N—O—M linkage or N—M linkage (hereinafter these linkages referred to as "N—Y—M linkage") is formed as follows:

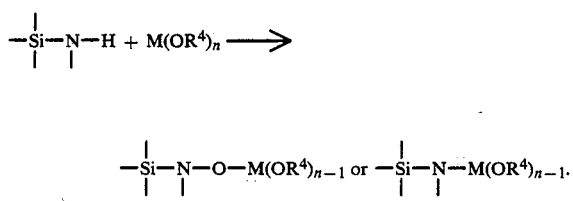

The metal alkoxide can have a maximum functionality of n. Therefore, the formed polymetalosilazane can be a polymer having a functionality of 1 to n with respect to the metal. The monofunctional polymer has the following structure having a pendant group introduced into Si and/or N of the main chain:

$$\begin{matrix} R^1 & H & & R^1 \\ | & | & & | \\ Si-N & & Si-N \\ | & & | & | \\ O & & H & Y \\ | & & & | \\ M(OR^4)_{n-1} & & M(OR^4)_{n-1} \end{matrix} \quad (III)$$

In the polymer having a functionality of 2 to n, a circular or crosslinked structure is formed through the atom M in the polysilazane skeleton. The circular structure includes a structure in which two functional groups in one molecule of the metal alkoxide are condensed with adjacent silicon and nitrogen atoms of the polysilazane. The crosslinked structure is formed when at least two functional groups of the metal alkoxide are condensed with at least two molecules of the polysilazane. These structures are shown below:

$$\begin{matrix} R^1 & H & & R^1 \\ | & | & & | \\ Si-N & & Si-N \\ | & & | & | \\ O & & H & Y \\ | & & & | \\ M(OR^4)_{n-2} & & M(OR^4)_{n-2} \\ | & & | & \\ O & & R^1 & Y \\ | & & | & | \\ Si-N & & Si-N \\ | & | & & | \\ R^1 & H & & H \end{matrix} \qquad \begin{matrix} R^1 & H & & R^1 \\ | & | & & | \\ Si-N & & Si-N \\ | & & & \\ O & & O & Y \\ | & & \diagdown & \diagup \\ M(OR^4)_{n-2} & & M(OR)_{n-2}. \\ | & & \\ Y & H & \\ | & | & \\ N-Si & \\ | & \\ R^1 \end{matrix} \quad (IV)$$

Some polymers having a functionality of 3 to n have both the above-mentioned circular structure and the crosslinked structure. In general, a polymer represented by the formula (III) or (IV) is obtained by the reaction between the polysilazane and the metal alkoxide.

The above-mentioned structural change to the metalosilazane from the polysilazane is basically due to the formation of a pendant group or a circular or crosslinked structure in the skeleton of the polysilazane.

The metal of the polymetalosilazane provided according to the present invention is selected from the group consisting of metals of groups IIA and III through V, preferably groups III and IV of the Periodic Table. For example, there can be mentioned metals of group IIA such as Be, Mg, Ca, Sr and Ba, metals of group IIIA such as Sc, Y, lanthanide elements and actinide elements, metals of group IVA such as Ti, Zr and Hf, metals of group VA such as V, Nb and Ta, metals of group IIIB such as B, Al, Ga, In and Tl, metals of group IVB such as Si, Ge, Sn and Pb and metals of group VB such as As, Sb and Bi. Alkoxides of Ti, Al, Zn, B and Y are preferred. Most of metal alkoxides containing these metals are marketed. Even metal alkoxides not marketed can be prepared according to processes similar to those adopted for the production of marketed metal alkoxides.

Any polysilazane containing at least an Si—H bond or an N—H bond in the molecule can be used as the polysilazane in the present invention. Not only such a polysilazane but also a copolymer of the polysilazane with other polymer or a blend of the polysilazane and other compound can be used.

Polysilazanes that can be used in the present invention have a linear, circular or crosslinked structure or two or more of these structures in the molecule. These polysilazanes can be used singly or in the form of a mixture of two or more of them.

Generally speaking, the groups $R^1$, $R^2$ and $R^3$ in the formula (I) are preferably selected from the group consisting of a hydrogen atom, an alkyl group having 1 to 5 carbon atoms, an alkenyl group having 2 to 6 carbon atoms, a cycloalkyl group having 5 to 7 carbon atoms, an aryl group, an alkylsilyl group having 1 to 4 carbon atoms, an alkylamino group having 1 to 5 carbon atoms, and an alkoxy group having 1 to 5 carbon atoms. More preferably, they are selected from the group consisting of a hydrogen atom and methyl, ethyl, vinyl, alkyl, methylamino, ethylamino, methoxy and ethoxy groups.

Typical examples of the polysilazane used in the present invention will now be described, though polysilazanes that can be used in the present invention are not limited to those exemplified below.

The polysilazane of the general formula (I) in which each of $R^1$, $R^2$ and $R^3$ is a hydrogen atom is a perhydropolysilazane, and processes for the preparation thereof are disclosed in, for example, U.S. patent application Ser. No. 801,884 filed on Nov. 26, 1985, now U.S. Pat. No. 4,840,778; Japanese Unexamined Patent No. 60-145903; and D. Seyferth et al, Communication of Am. Ceram. Soc., C-13, January 1983. According to these processes, there is obtained a mixture of polymers differing in the structure, and in principle, the molecule contains a linear portion and a circular portion and can be represented by the following chemical formula:

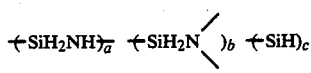

$(a + b + c = 1)$

An example of the structure of the perhydropolysilazane is as shown below:

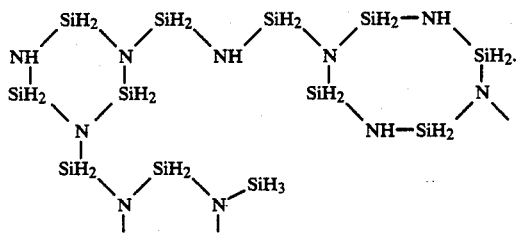

The process for the preparation of the polysilazane of the general formula (I) in which each of $R^1$ and $R^2$ is a hydrogen atom and $R^3$ is a methyl group is reported in D. Seyferth et al, Polym. Prepr., Am. Chem. Soc., Div. Polym. Chem., 25, 10 (1984). The polysilazane obtained according to this process is a linear or circular polymer having recurring units of

which does not contain a crosslinked structure.

The process for the preparation of the polyorgano(hydro)silazane of the general formula (I) in which each of $R^1$ and $R^3$ is a hydrogen atom and $R^2$ is an organic group is disclosed in D. Seyferth et al, Polym. Prepr., Am. Chem. Soc., Div. Polym. Chem., 25, 10 (1984) U.S. Pat. No. 849,755 filed on 04/09/86, now U.S. Pat. No. 4,659,850 and Japanese Unexamined Patent Publication No. 61-89230. The polysilazane prepared according to this in a polymer having recurring units

and has mainly a circular structure of a polymerization degree of 3 to 5 and a polymer having a linear structure and a circular structure in the molecule, which is represented by the following composition:

$(R^2SiHNH)_x[(R^2SiH)_{1.5}N]_{1-x}(0.4 < x < 1)$.

The polysilazane of the general formula (I) in which $R^1$ is a hydrogen atom and $R^2$ and $R^3$ are organic groups or in which $R^1$ and $R^2$ are organic groups and $R^3$ is a hydrogen atom has recurring units

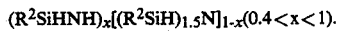

and has mainly a circular structure of a polymerization degree of 3 to 5.

Typical examples of the polysilazane used in the present invention, other than those represented by the general formula (I), are described below.

Some polyorgano(hydro)silazanes have a crosslinked structure in the molecule, as reported in D. Seyferth et al, Communication of Am. Ceram. Soc., C-132, July 1984. For example, a polymer having the following structure can be mentioned:

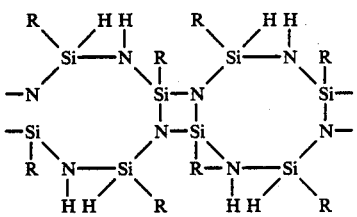

$R = CH_3$.

Furthermore, a polysilazane $[R^1Si(NH)_x]$ having a crosslinked structure, which is obtained by ammonolysis of $R^1SiX_3$ (in which X stands for a halogen atom) as reported in Japanese Unexamined Patent Publication No. 49-79717 and a polysilazane obtained by coammonolysis of $R^1SiX_3$ and $R^2{}_2SiX_2$, which has the following structure:

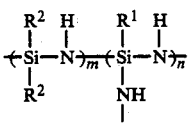

in which m and n are positive integers, can be used as the starting material in the present invention.

The polysilazane used in the present invention has the main chain skeleton consisting of units represented by the general formula (I), as pointed out hereinbefore. As seen from the foregoing structure, the units represented by the general formula (I) are sometimes cyclized, and in this case, the cyclized portion forms a terminal group. In case that the units are not cyclized, the terminal of the main chain skeleton can be a group similar to $R^1$, $R^2$ or $R^3$ or a hydrogen atom. Not only the above-mentioned polysilazanes soluble in an organic solvent but also polysilazanes insoluble in an organic solvent, for example, polysilazanes shown below, can be utilized as the starting material, although application of these polysilazanes is restricted to some extent because their reaction products with metal alkoxides are insoluble in an organic solvent:

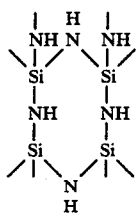

[Si(NH)$_2$]$_n$, M. Billy, Bull. Soc. Chim. Fr., 183 (1962)

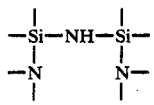

[Si$_2$N$_3$H]$_n$, M. Billy, Bull. Soc. Chim. Fr., 1550 (1961)

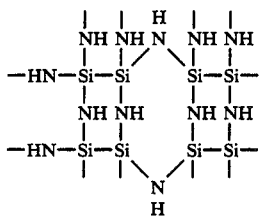

[Si$_2$(NH)$_3$]$_n$

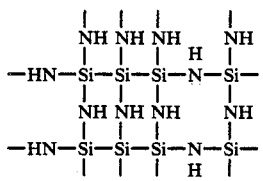

[Si$_3$(NH)$_4$]$_n$

M. Billy, Compt. Rend., 250, 4163 (1960); 251, 1639 (1960)

The contents of the publications mentioned above are included herewith by reference.

The number average molecular weight of the novel polymetalosilazane of the present invention is in the range of 200 to 500,000, preferably 400 to 300,000.

In accordance with the present invention, there is also provided a process for the preparation of a novel polymetalosilazane as described above, which comprises reacting a polysilazane having a number average molecular weight of about 100 to about 50,000, which has a main skeleton consisting essentially of units represented by the following general formula (I):

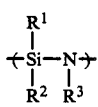

(I)

wherein $R^1$, $R^2$ and $R^3$ independently stand for a hydrogen atom, an alkyl group, an alkenyl group, a cycloalkyl group, an aryl group, a group other than the above-mentioned groups, in which the group bonded directly to the silicon atom is a carbon atom, an alkylsilyl group, an alkylamino group or an alkoxy group, with the proviso that at least one of $R^1$, $R^2$ and $R^3$ is a hydrogen atom, with a metal alkoxide represented by the following general formula (II):

$$M(OR^4)_n \qquad (II)$$

wherein M stands for at least one metal selected from the group consisting of metals of groups IIA and III through V of the Periodic Table, $R^4$'s which may be the same or different stand for a hydrogen atom or an alkyl group having 1 to 20 carbon atom or aryl group, with the proviso that at least one of $R^4$'s is the/above-mentioned alkyl group or aryl group, and n stands for the valency of M, to obtain a novel polymetalosilazane having a metal/silicon atomic ratio of 0.001 to 3 and a number average molecular weight of about 200 to about 500,000.

The molecular weight of the polysilazane used in the present invention is not particularly critical, and available polysilazanes can be used. In view of the reactivity with the metal alkoxide, $R^1$, $R^2$ and $R^3$ in the formula (I) may be groups having a small steric hindrance. Namely, preferably $R^1$, $R^2$ and $R^3$ are selected from a hydrogen atom and alkyl groups having 1 to 5 carbon atoms, and more preferably $R^1$, $R^2$ and $R^3$ are selected from a hydrogen atom and alkyl groups having 1 to 2 carbon atoms.

The kind of the metal alkoxide used in the present invention is not particularly critical, but in view of the reactivity, $R^4$ in the formula (II) may be hydrogen atom, aryl group or an alkyl group having 1 to 20 carbon atoms, preferably to 1 to 10 carbon atoms, more preferably 1 to 4 carbon atoms. Preferably, $R^4$ in the formula (II) is selected from the group of hydrogen, methyl, n-propyl, i-propyl, n-butyl, i-butyl, t-butyl, phenyl, benzyl and tolyl groups. The polysilazane/metal alkoxide mixing ratio is such that the M/Si atomic ratio is from 0.001 to 60, preferably from 0.01 to 5, more preferably from 0.05 to 2.5. If the amount added of the metal alkoxide is too large and exceeds the above-mentioned range, the metal alkoxide is recovered in the unreacted state without increase of the reactivity with the polysilazane. If the amount added of the metal alkoxide is too small, prominent increase of the molecular weight is not caused to occur.

The reaction may be carried out in the absence of a solvent but the control of the reaction is difficult compared with the control of the reaction using an organic solvent and a gelatinous substance is sometimes formed. Therefore, use of an organic solvent is generally preferred. As the solvent, there can be used hydrocarbon solvents such as aromatic hydrocarbons, aliphatic hydrocarbons and alicyclic hydrocarbons, halogenated hydrocarbons, aliphatic ethers and alicyclic ethers. As preferred solvents, there can be mentioned benzene, toluene, xylene, methylene chloride, chloroform, ethyl ether and tetrahydrofuran.

The reaction temperature is preferably such that the reaction mixture is kept liquid. In order to further increase the molecular weight of the polymetalosilazane, the reaction can be carried out at a temperature higher than the boiling point of the solvent, but to prevent gelation by thermal decomposition of the polymetalosilazane, it is generally preferred that the reaction be carried out at a temperature lower than 400° C.

Preferably the reaction is carried out under atmospheric pressure. The reaction may be carried out under an elevated pressure, but a reduced pressure is not preferred because low-boiling-point components are distilled off and the yield is reduced. The reaction time is generally about 30 minutes to about 1 day, but to further increase the molecular weight of the polymetalosilazane, preferably the reaction time is prolonged.

In order to prevent oxidation or hydrolysis of the starting metal alkoxide and polysilazane and the formed polymetalosilazane, preferably a dried inert atmosphere such as dry nitrogen or dry argon is used as the reaction atmosphere.

The formed polymetalosilazane can be separated from the starting metal alkoxide by removal of the metal alkoxide by distillation, gel permeation chromatography or high-performance liquid chromatography.

The novel polymetalosilazane obtained according to the process of the present invention is a polymer having a structure in which a part of the silicon-hydrogen bond of the polysilazane is condensed with the organic group of the metal alkoxide to form a silicon-oxygen-metal linkage afresh and/or a part of the nitrogen-hydrogen bond of the polysilazane is condensed with the metal alkoxide. The number average molecular weight of this polymer is 200 to 500,000, preferably 400 to 300,000 and the polymer is soluble in an organic solvent. The metal/silicon atomic ratio of the polymer is 0.001 to 3, preferably 0.001 to 2.5, more preferably 0.01 to 2.0.

The polymetalosilazane is converted to a ceramics by pyrolysis in an atmospheric gas or in vacuo. Nitrogen is preferred as the atmospheric gas, but argon and ammonia can be used. Furthermore, a mixed gas of nitrogen, ammonia, argon and hydrogen can be used.

The heat treatment temperature is generally in the range of 700° to 1900° C. If the pyrolysis temperature is too low, a long time is required for the calcination. If the pyrolysis temperature is too high, the process becomes disadvantageous from the viewpoint of the energy cost.

The novel polymetalosilazane provided according to the present invention is soluble in an organic solvent and since the polymetalosilazane is converted to a ceramic of the S—M—N—O or Si—M—O—N—C system by calcination, a composite ceramic molded body having high performances can be provided by using the polymetalo-silazane of the present invention. Namely, a high-hardness continuous fiber, film, coating, powder or foam having a high mechanical strength at high temperatures, a high heat resistance, an excellent corrosion resistance and an excellent thermal shock resistance can be obtained. Furthermore, the polymetalosilazane of the present invention can be used as a sintering binder or an impregnating agent.

The novel polymetalosilazane of the present invention has the following effects or advantages.

(1) If the polymetalosilazane is pyrolized at a high temperature, an amorphous phase is formed and formation of crystalline α-type or β-type silicon nitride observed, for example, when a perhydropoly-silazane fiber is pyrolized at a high temperature, can be controlled. Accordingly, the mechanical strength of the ceramic fiber can be improved.

(2) Since the crosslinked structure density and molecular weight of the polymetalosilazane are increased over those of the starting polysilazane, the solidifying property at the drying step after molding can be improved.

(3) In the ceramics of the Si—M—N—O or Si—M—N—O—O—C system obtained by pyrolysis of the polymetalosilazane, the metal atom is contained. Therefore, when the polymetalosilazane is utilized as a composite material, the compatibility with a metal (especially M) is improved.

EXAMPLES

The present invention will now be described in detail with reference to the following examples.

Example 1 [Production of Starting Perhydropoly-silazane]

A gas blowing tube, a mechanical stirrer and a Dewar condenser were attached to a four-necked flask having an inner volume of 1 l. The inner atmosphere of the reaction vessel was replaced with dry nitrogen, from which oxygen had been removed, and the four-necked flask was charged with 490 ml of degassed dry pyridine and the content was cooled with ice. Then, 51.6 g of dichloro-silane was added to form a white solid adduct ($SiH_2Cl_2 \cdot 2C_5H_5N$). The reaction mixture was cooled with ice and 51.0 g of ammonia refined through a sodium hydroxide and an active carbon was blown into the reaction mixture with stirring. Then, the mixture was heated at 100° C.

After termination of the reaction, the reaction mixture was subjected to centrifugal separation, washed with dry pyridine and filtered in a nitrogen atmosphere to obtain 850 ml of the filtrate. When the solvent was removed from 5 ml of the filtrate by distillation under reduced pressure to obtain 0.102 g of a resinous solid perhydropolysilazane.

Figure 2:
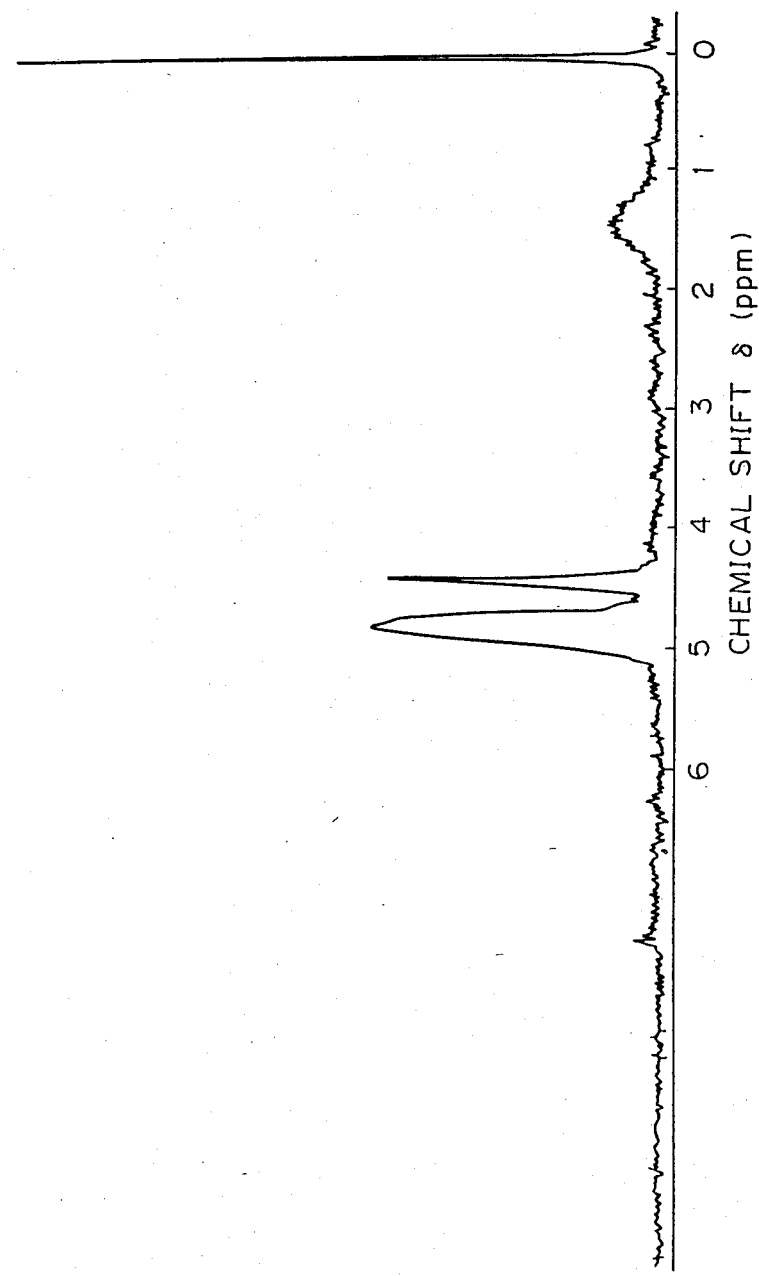

The number average molecular weight of the obtained polymer was 1120 as determined by the cryoscopic method using dry benzene as the solvent. As shown in FIG. 1, the IR (infrared absorption) spectrum (solvent=dry o-xylene, perhydropolysilazane concentration=10.2 g/l) had absorptions due to NH at wave numbers ($cm^{-1}$) of 3350 (apparent absorptivity $\epsilon = 0.557 \, lg^{-1}cm^{-1}$) and 1175, an absorption due to SiH at 2170 ($\epsilon = 3.14$) and absorptions due to SiH and SiNSi at 1020 to 820. The $^1$HNMR (proton nuclear magnetic resonance) spectrum (60 MHz, solvent $CDCl_3$/reference substance TMS) had broad absorptions as shown in FIG. 2, that is, absorptions at δ 4.8 and 4.4 (broad, SiH) and 1.5 (broad, NH).

Example 2 [Production of Polymethyl(hydro)silazane]

A gas blowing tube, a thermometer, a mechanical stirrer and a Dewar condenser were attached to a four-necked flask having an inner volume of 500 ml. The inner atmosphere of the reaction system was replaced with nitrogen gas, and 24.3 g (0.211 mole) of methyldichlorosilane and 300 ml of dry dichloromethane were charged in the four-necked flask and cooled with ice. Then, 20.5 g (1.20 moles) of dry ammonia was blown into the mixture with stirring together with nitrogen gas to effect ammonolysis.

After termination of the reaction, the reaction mixture was subjected to centrifugal separation and filtration. The solvent was removed from the filtrate to obtain 8.79 g of a polymethyl(hydro)silazane in the form of a colorless liquid. The number average molecular weight of the product was 310 as determined by the cryoscopic method.

Example 3 [Production of Polymethyl(hydro)silazane]

Figure 3:
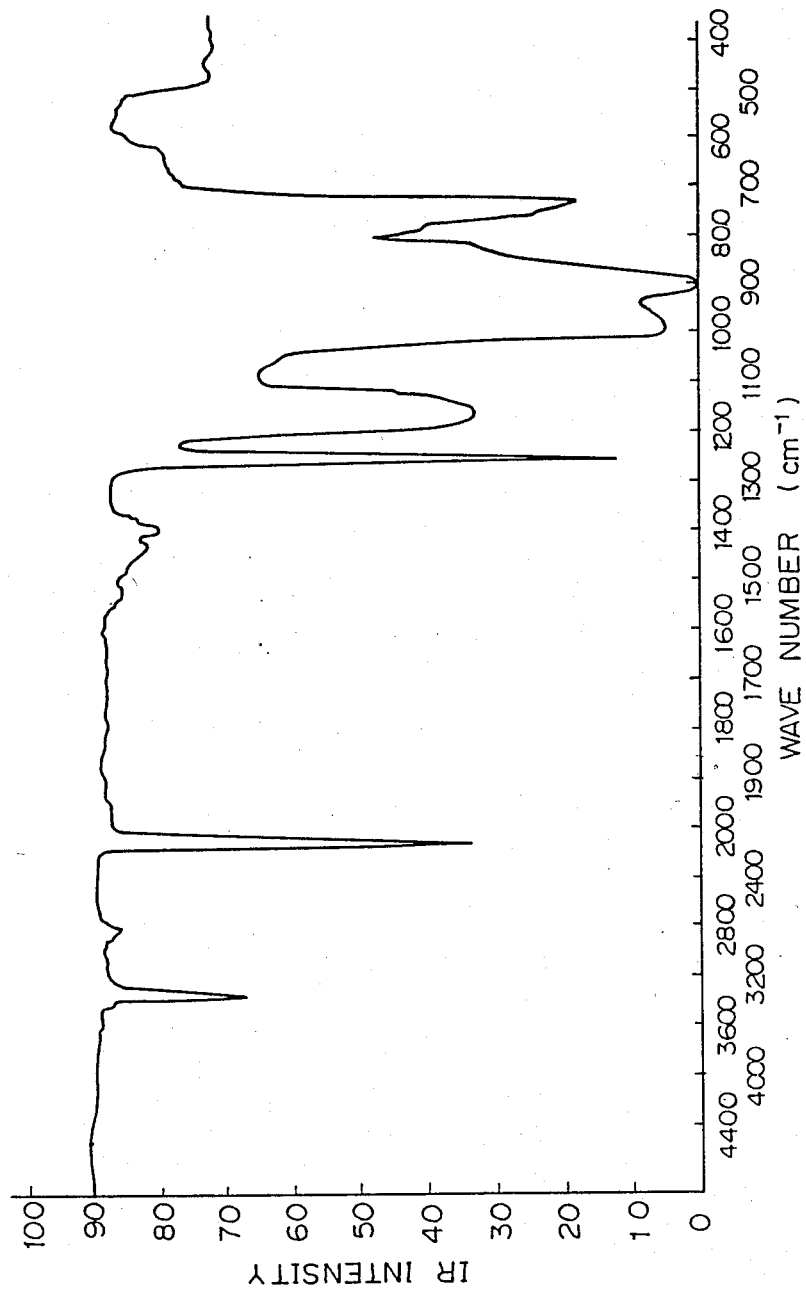
FIGS. 3 and 4 are IR spectrum and $^1$HNMR spectrum of the polymethyl(hydro)silazane in Example 3.

A gas-introducing tube, a thermometer, a condenser and a dropping funnel were attached to a four-necked flask having an inner volume of 100 ml, and the inner atmosphere of the reaction system was replaced with argon gas. The four-necked flask was charged with 12 ml of dry tetrahydrofuran and 0.189 g (4.71 millimoles) of potassium hydride and magnetic stirring was started. Then, 5.00 g of the product synthesized in Example 2 and 50 ml of dry tetrahydrofuran were charged into the dropping funnel and dropped into potassium hydride. Reaction was carried out at room temperature for 1 hour. Then, 1.60 g (11.3 millimoles) of iodomethane and 1 ml of dry tetrahydrofuran were charged in the dropping funnel and dropped in the reaction solution. Reaction was carried out at room temperature for 3 hours. The solvent was removed from the reaction mixture by distillation under reduced pressure, and 40 ml of dry n-hexane was added to the residue and the mixture was subjected to centrifugal separation and filtration. The solvent was removed from the filtrate by distillation under reduced pressure to obtain 4.85 g of a polymethyl-(hydro)silazane in the form of a white powder. The number average molecular weight of the product was 1060 as determined by the cryoscopic method. In the IR spectrum (dry o-xylene, polymethyl(hydro)silazane concentration=43.2 g/l), there were observed absorptions due to NH at 3380 cm$^{-1}$ (apparent absorptivity $\epsilon$=0.249 lg$^{-1}$/cm$^{-1}$) and 1160 cm$^{-1}$, an absorption due to SiH at 2120 cm$^{-1}$ ($\epsilon$=0.822) and an absorption due to SiCH$_3$ at 1255 cm$^{-1}$, as shown in FIG. 3.

Figure 4:
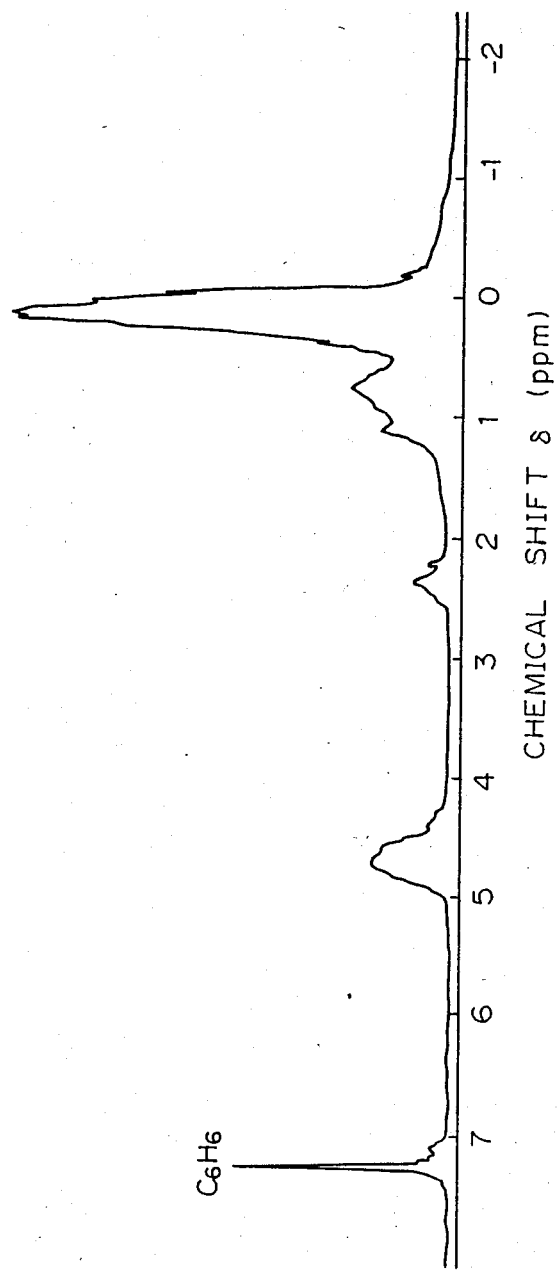

The $^1$HNMR spectrum (60 MHz, CDCl$_3$/C$_6$H$_6$) is shown in FIG. 4. Since there were observed absorptions at $\delta$ 4.7 (SiH, 0.56H), 2.4 (NCH$_3$, 0.15H), 0.7 (NH, 0.51H) and 0.2 (SiCH$_3$, 3H), it was confirmed that the product had a composition of (CH$_3$SiHNH)$_{0.51}$(CH$_3$SiN)$_{0.44}$(CH$_3$SiHNCH$_3$)$_{0.05}$.

Example 4 [Production (1) of Polytitanosilazane]

To 10.0 ml of a solution of the perhydropolysilazane obtained in Example 1 in dry o-xylene (the perhydropoly-silazane concentration was 8.30 g/l) was added 0.234 g (0.823 millimole) of titanium tetra-isopropoxide in a nitrogen atmosphere, and the mixture was violently stirred, whereby the colorless reaction solution was blackened.

Figure 5:
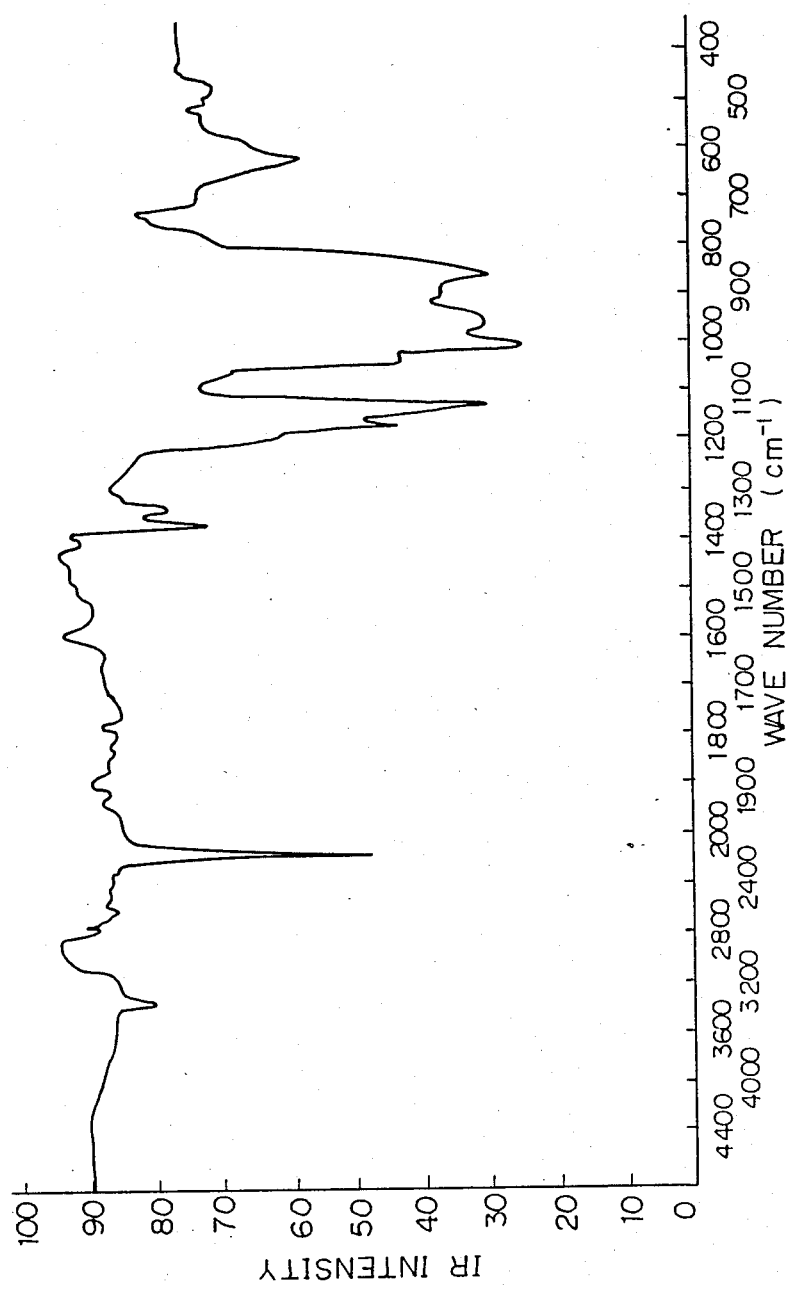
FIG. 5 is an IR spectrum of the polytitanosilazane in Example 4.

The IR spectrum (dry o-xylene) of the reaction solution is shown in FIG. 5. The apparent absorptivities $\epsilon$ (1g$^{-1}$cm$^{-1}$) at 3350 and 2170 cm$^{-1}$ were reduced to 0.356 and 2.34, respectively. By comparison with the calibration curve of the perhydropolysilazane prepared in advance, it was found that the concentration to the absorption (3350 cm$^{-1}$) attributed to NH corresponded to 5.20 g/l and the concentration to the absorption (2170 cm$^{-1}$) attributed to SiH corresponded to 5.90 g/l. Namely, it was confirmed that about 29% of the Si-H bond and about 37% of the N-H bond in the perhydropolysilazane disappeared as the result of the reaction with titanium tetra-isopropoxide. In addition to the absorptions 3350 and 2170 cm$^{-1}$, there were observed absorptions at 1365 and 1335 cm$^{-1}$ [$\delta$(CH$_3$)$_2$CH—], 1160, 1125 and 1000 cm$^{-1}$ [$\gamma$(C—O)Ti], 950 cm$^{-1}$ [$\gamma$Si—OTi, $\gamma$(C—O)Ti] and 615 cm$^{-1}$ ($\gamma$Yi—O).

Example 5 [Production (2) of Polytitanosilazane]

A condenser, a serum cap, a thermometer and a magnetic stirrer were attached to a four-necked flask having an inner volume of 200 ml, and the inner atmosphere of the reaction vessel was replaced by dry nitrogen. The four-necked flask was charged with 110 g of a benzene solution of the perhydropolysilazane obtained in Example 1 (the perhydropolysilazane concentration was 4.57% by weight), and a solution of 6.30 g (22.2 millimoles) of titanium tetra-isopropoxide in 6.5 ml of dry benzene was added to the above solution by using a syringe with stirring. The colorless reaction solution was changed to a light brown solution and a violet solution and finally to a black solution. After termination of the reaction, the solvent was removed by distillation under reduced pressure to obtain a polyhydrotitanosilazane in the form of a dark brown solid. The yield was 84.0% by weight.

The number average molecular weight of the formed polymer was 1840 as determined by the cryoscopic method using dry benzene as the solvent. The product obtained was not a mere mixture of the perhydropolysilazane and titanium alkoxide but a polymer having a molecular weight increased by condensation between both the substances.

Figure 6:
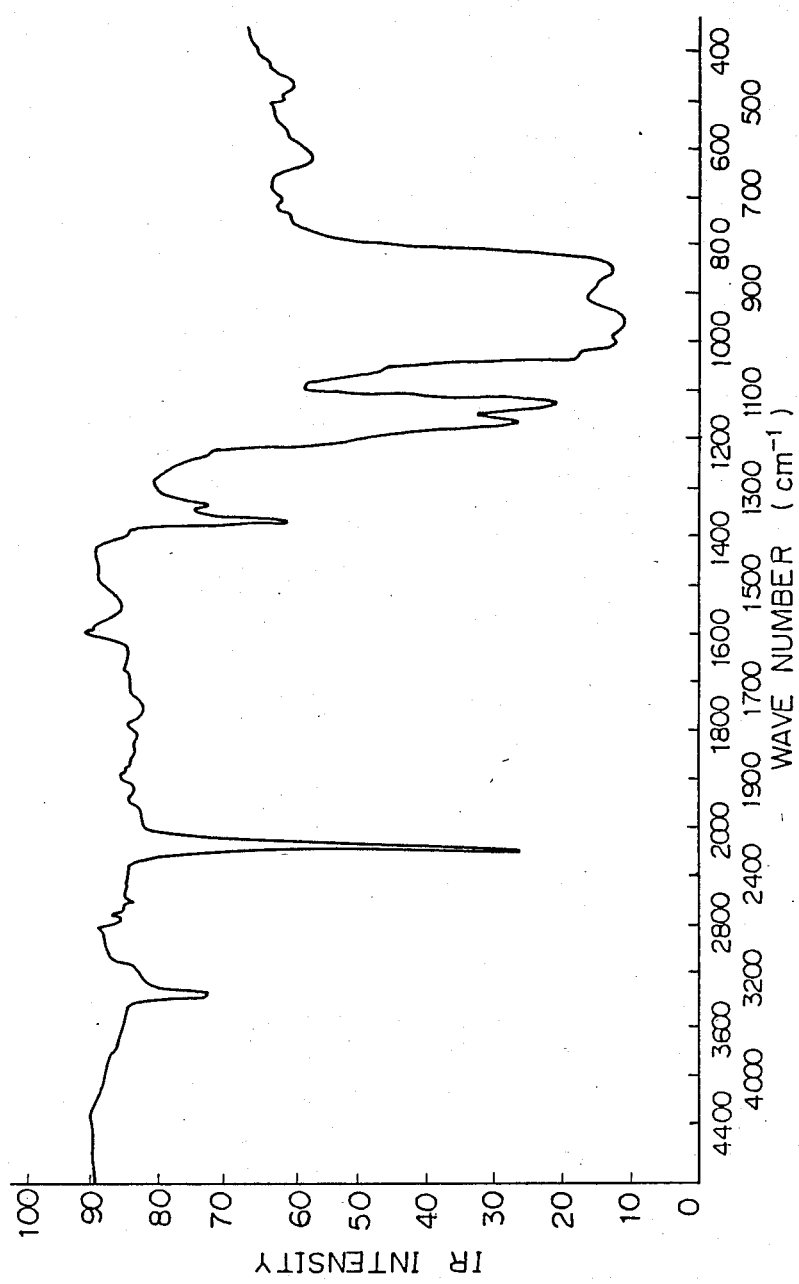
FIGS. 6 and 7 are IR spectrum and $^1$HNMR spectrum of the polytitanosilazane in Example 5.
Figure 7:
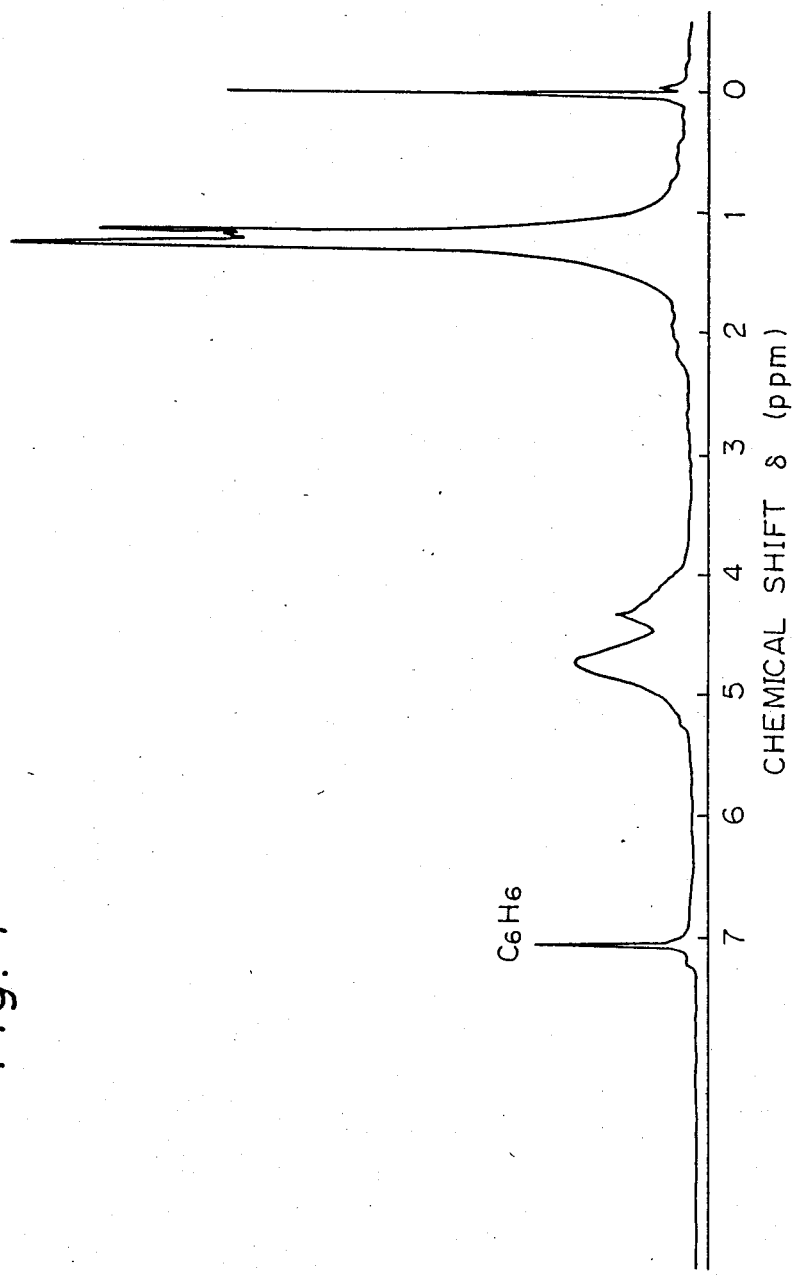

The IR spectrum (dry benzene) of the product is shown in FIG. 6. The spectrum observed was similar to that of the product of Example 1 (see FIG. 5). The $^1$HNMR spectrum (60 MHz, CDCl$_3$/TMS) of the product is shown in FIG. 7. There were observed adsorptions at $\delta$ 4.7 and 4.3 [broad, SiH, (CH$_3$)$_2$CHO13 ] and 1.2 [dublet, (CH$_3$)$_2$CHO—, NH.

From the results of the elementary analysis, it was confirmed that the polymer had a composition comprising 33.0% by weight of Si, 9.8% by weight of Ti, 14.0% by weight of N, 11.8% by weight of O, 23.4% by weight of C and 6.6% by weight of H.

Figure 8:
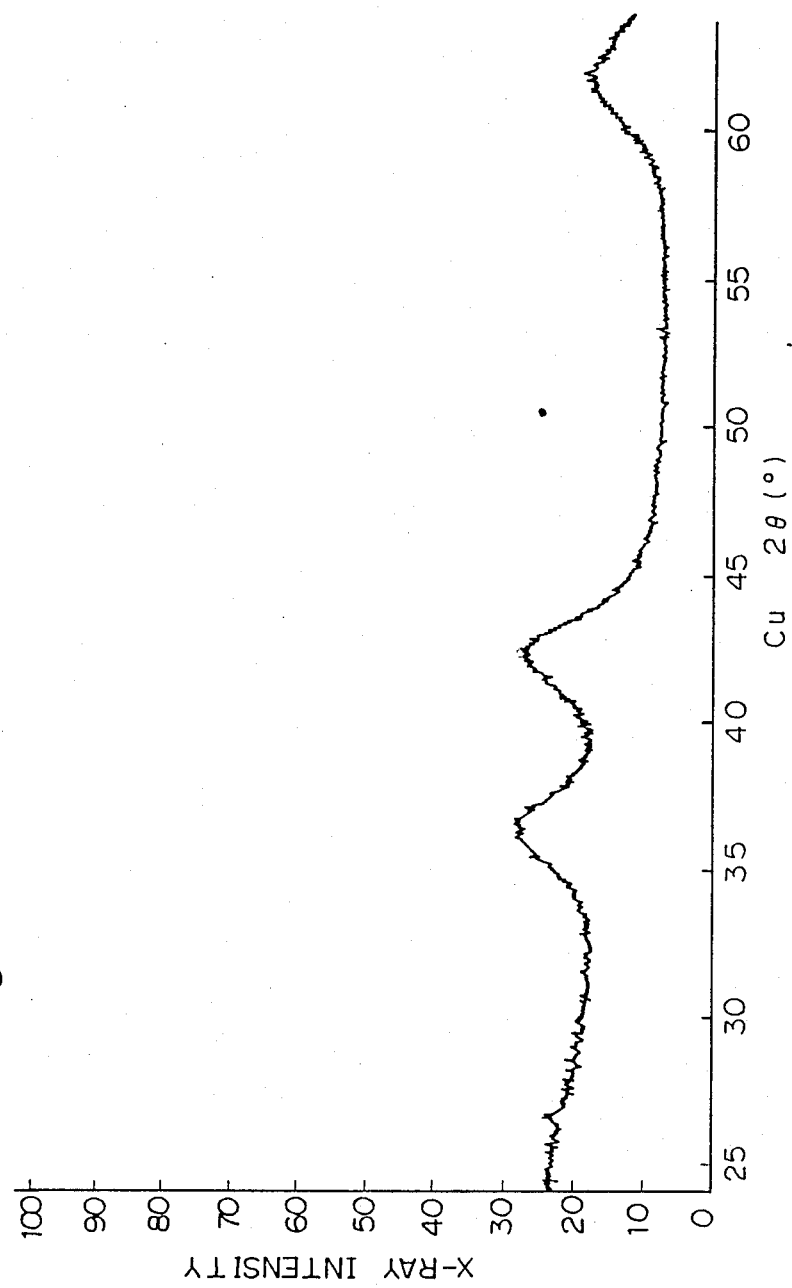
FIG. 8 is an X-ray powder diffraction diagram of the ceramics prepared by pyrolysis of the polytitanosilazane in Example 5.

When the obtained polymer was heat treated at 1350° C. for 1 hour in a nitrogen atmosphere, a black solid was obtained in a yield of 72% by weight. When this substance was subjected to the X-ray powder diffractometry, only a diffraction pattern of an amorphous TiN phase was observed, as shown in FIG. 8. When the perhydropolysilazane was pyrolized under the same conditions as described above, formation of X-ray crystallogrphically crystalline silicon nitride was confirmed. However, if the polyhydrotitanosilazane was used as the precursor, the amorphous state was maintained in silicon nitride even at higher temperatures.

From the results of the elementary analysis, it was confirmed that the obtained ceramics comprised 41.3% by weight of Si, 12.9% by weight of Ti, 20.5% by weight of N, 19.9% by weight of O and 4.5% by weight of C.

Example 6 [Production (3) of Polytitanosilazane]

A condenser, a serum cap, a thermometer and a magnetic stirrer were attached to a four-necked flask having an inner volume of 50 ml and the inner atmosphere of the reaction vessel was replaced with dry nitrogen. The reaction vessel was charged with 0.733 g of the polymethyl(hydro)silazane synthesized in Example 3 and 20 ml of dry o-xylene, and 0.846 g (2.98 millimoles) of titanium tetra-isopropoxide was added with stirring. Reaction was carried out at 130° to 135° C., whereby the colorless reaction solution was changed to a yellow solution. After termination of the reaction, the reaction solution was cooled to room temperature and transferred to a graduated flask having a volume of 25 ml in a nitrogen atmosphere and dry o-xylene was added to the solution so that the liquid level reached the scale line. The mixture was stirred, and the IR spectrum was measured.

Figure 9:
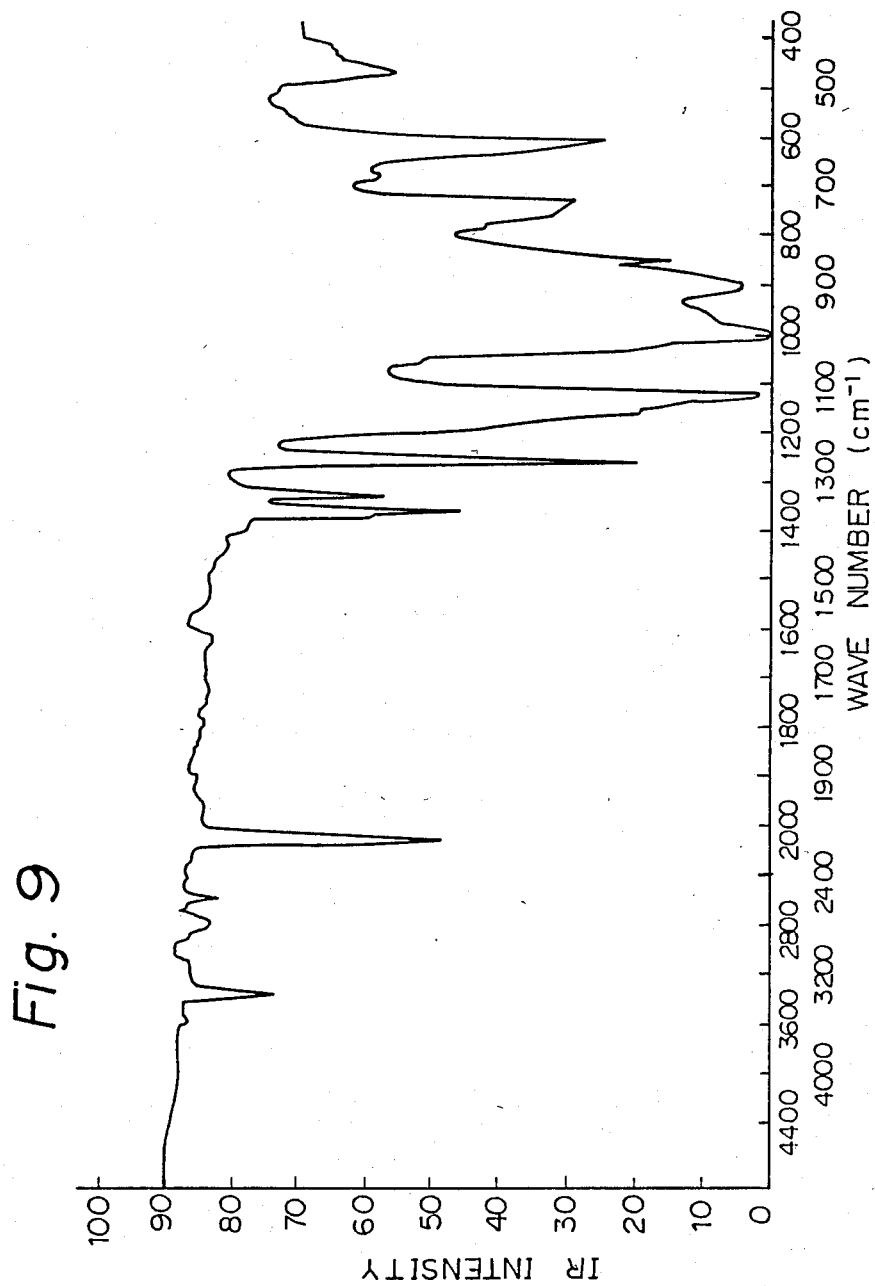
FIG. 9 is an IR spectrum of the polytitano-silazane in Example 6.

As shown in FIG. 9, the apparent absorptivity ε (1g$^{-1}$cm$^{-1}$) at 3380 and 2120 cm$^{-1}$ were reduced to 0.193 and 0.669, respectively. By comparison with the calibration curve of the polymethyl(hydro)silazane (synthesized in Example 3) prepared in advance, it was found that the concentration to the absorption (3380 cm$^{-1}$) due to NH corresponded to 22.7 g/l and the concentration to the absorption (2120 cm$^{-1}$) due to SiH corresponded to 23.9 g/l. Namely, it was confirmed that 22% of the N—H bond and 19% of the Si—H bond in the polymethyl(hydro)silazane disappeared as the result of the reaction with titanium tetraisopropoxide. In addition to the absorptions at 3380 and 2120 cm$^{-1}$, there were observed absorptions at 1360 and 1330 cm$^{-1}$ [δ(CH$_3$)$_2$CH—], 1160, 1120 and 995 cm$^{-1}$ [γ(C—O)Ti] and 615 [γTi—O].

When the solvent was removed from the reaction solution by distillation under reduced pressure, 0.972 g of a blue solid was obtained in a yield of 61.6% by weight.

The number average molecular weight of the formed polymethyltitanosilazane was 1510 as determined by the cryoscopic method.

From the results of the elementary analysis, it was confirmed that the polymer had a composition comprising 36.4% by weight of Si, 5.3% by weight of Ti, 17.8% by weight of N, 6.6% by weight of O, 27.1% by weight of C and 5.9% by weight of H.

The polymethyl(hydro)silazane (synthesized in Example 3) in dry o-xylene was heat-treated under the same conditions as described in Example 5 except that titanium tetra-isopropoxide was not used. The IR spectrum of the product was the same as that of the starting substance, and the N-H bond and Si-H bond of the polymethyl(hydro)silazane were kept unreacted. Accordingly, it was confirmed that the polymethyl-(hydro)silazane was not changed only by the heat treatment of Example 5.

Example 7 [Production (1) of Polyaluminosilazane]

To 60.0 ml of a solution of the perhydropolysilazane obtained in Example 1 in dry o-xylene (the perhydropoly-silazane concentration was 8.14 g/l) was added 0.4473 g (2.19 millimoles) of aluminum tri-isopropoxide in a nitrogen atmosphere to form a homogeneous mixed solution. At this point, the ratio of the total number of the structural units

to the total number of the structural units

was about 3/2. The mixed solution was refluxed and reacted at 130° C. with stirring for 2 hours.

Figure 10:
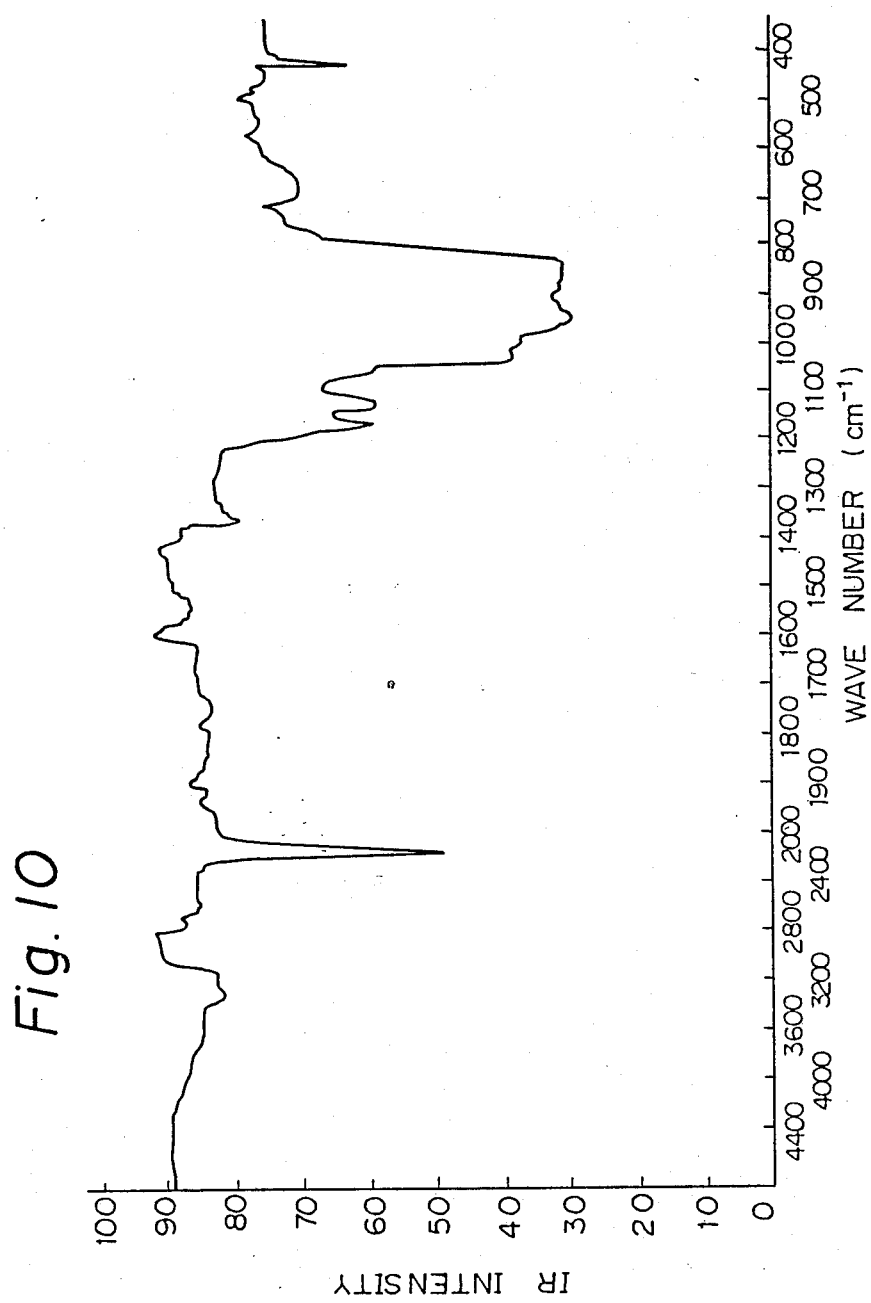
FIG. 10 is an IR spectrum of the polyalumino-silazane in Example 7.

The IR spectrum (dry o-xylene) of the reaction solution is shown in FIG. 10. The apparent absorptivity ε (1g$^{-1}$cm$^{-1}$) at 3350 and 2170 cm$^{-1}$ were reduced to 0.184 and 2.14, respectively. By comparison with the calibration curve of the perhydropolysilazane prepared in advance, it was confirmed that the concentration to the absorption (3350 cm$^{-1}$) attributed to NH corresponded to 2.5 g/l and the concentration to the adsorption (2170 cm$^{-1}$) due to SiH corresponded to 5.2 g/l. Namely, it was confirmed that about 36% of the Si—H bond end about 69% of the N—H bond in the perhydropolysilazane disappeared as the result of the reaction with aluminum tri-isopropoxide.

Example 8 [Production (2) of Polyaluminosilazane]

A condenser, serum cap and a magnetic stirrer were attached to a four-necked flask having an inner volume of 200 ml. The inner atmosphere of the reaction vessel was replaced with dry argon, and 1.50 g (7.34 millimoles) of aluminum triisopropoxide was charged into the four-necked flask and 83 ml of a benzene solution of the perhydropolysilazane obtained in Example 1 (the perhydro-polysilazane concentration was 40.72 g/l) was added with stirring by using a syringe to form a homogeneous mixed solution. The solution was refluxed and reacted at 80° C. in an argon atmosphere for 2 hours. The colorless reaction solution was changed to a light yellow solution.

The number average molecular weight of the formed polymer was 1710 as determined by the cryoscopic method using dry benzene as the solvent. The obtained product was not a mere mixture of the perhydropolysilazane and aluminum tri-isopropoxide but a polymer formed by the reaction between both the substances.

Figure 11:
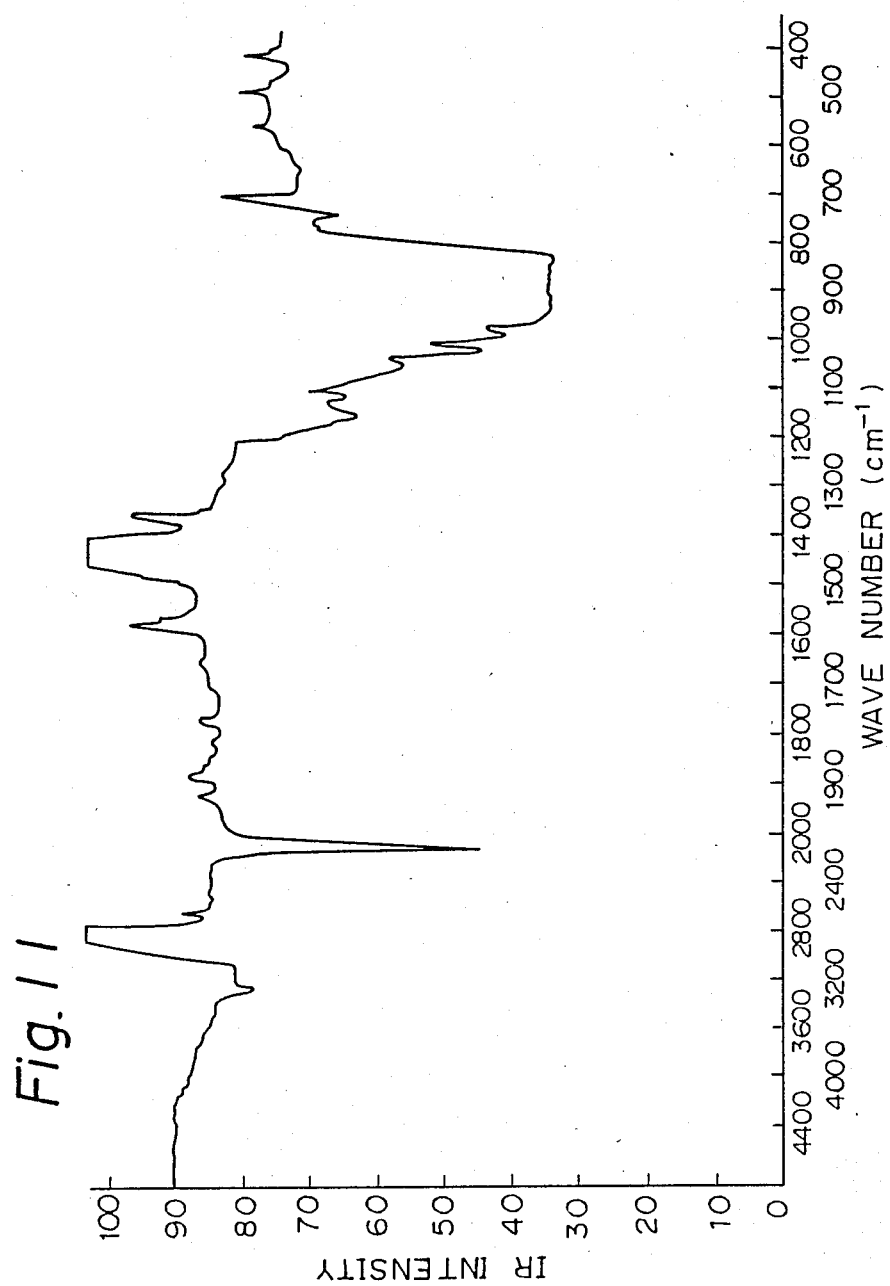
FIGS. 11 and 12 are IR spectrum and $^1$HNMR spectrum of the polyaluminosilazane in Example 8.
Figure 12:
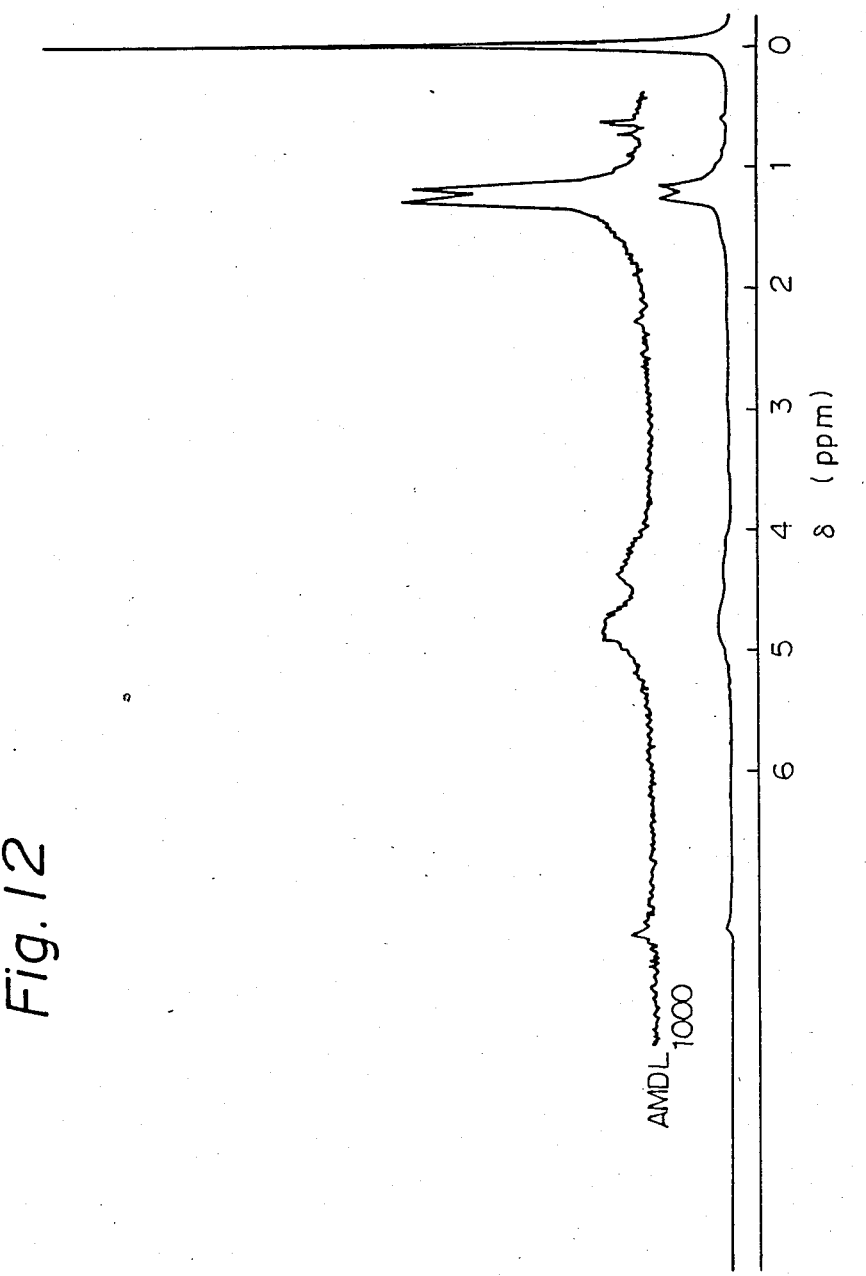

The IR spectrum (dry benzene) of the polymer is shown in FIG. 11. The absorption spectrum observed was substantially the same as that of the product obtained in Example 7 (see FIG. 10). The $^1$HNMR spectrum (60 MHz, CDCl$_3$/TMS) is shown in FIG. 12. There were observed absorptions at δ 4.7 and 4.3 [broad, SiH, (CH$_3$)$_2$CHO—] and 1.2 [dublet, (CH$_3$)$_2$CHO—, NH].

After termination of the refluxing reaction, the solvent was removed by distillation under reduced pressure to obtain a polyaluminosilazane in the form of a light yellow resinous solid. From the results of the elementary analysis, it was confirmed that the polymer had a composition comprising 45.6% by weight Si, 4.4% by weight of Al, 23.9% by weight of N, 8.88% by weight of O, 12.8% by weight of C and 5.05% by weight of H.

Figure 13:
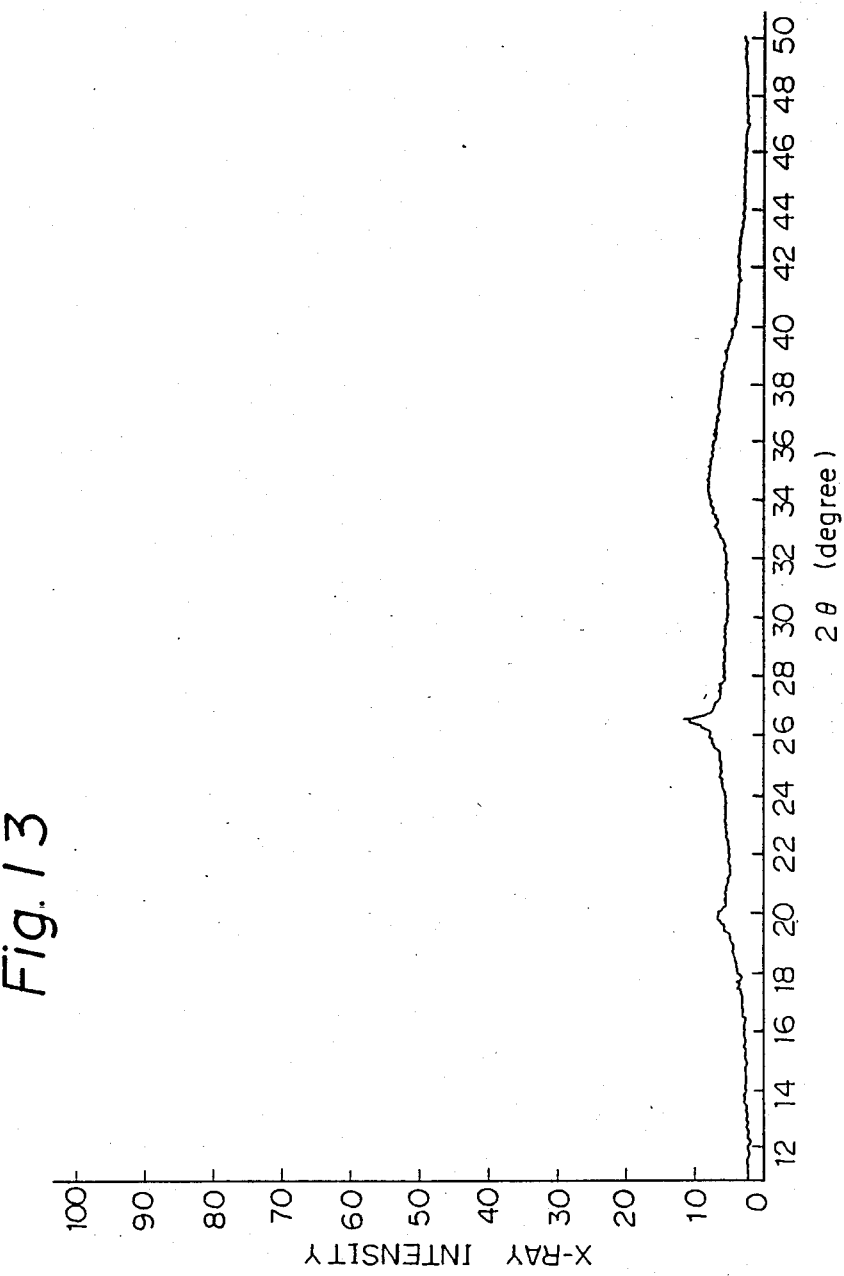
FIGS. 13 and 14 are powder X-ray diffraction diagrams of the ceramics obtained by pyrolysis of the polyaluminosilazane in Example 8.

The obtained polymer was heated in a nitrogen atmosphere while elevating the temperature to 1350° C. at a rate of 10° C./min, and pyrolysis was carried out at 1350° C. for 1 hour to obtain a black solid in a yield of 83% by weight. When the powder X-ray diffractometry of the obtained substance was carried out, only a diffraction pattern of an amorphous substance was observed, as shown in FIG. 13. For example, when the perhydropolysilazane was heat treated under the same conditions as described above, formation of crystalline silicon nitride was confirmed. In contrast, when the polyaluminosilazane was used as the precursor, the amorphous state of silicon nitride was held even at higher temperatures.

From the results of the elementary analysis, it was confirmed that the obtained ceramics had a composition comprising 53.7% by weight of Si, 4.86% by weight of Al, 8.9% by weight of O, 24.4% by weight of N and 6.14% by weight of C.

Figure 14:
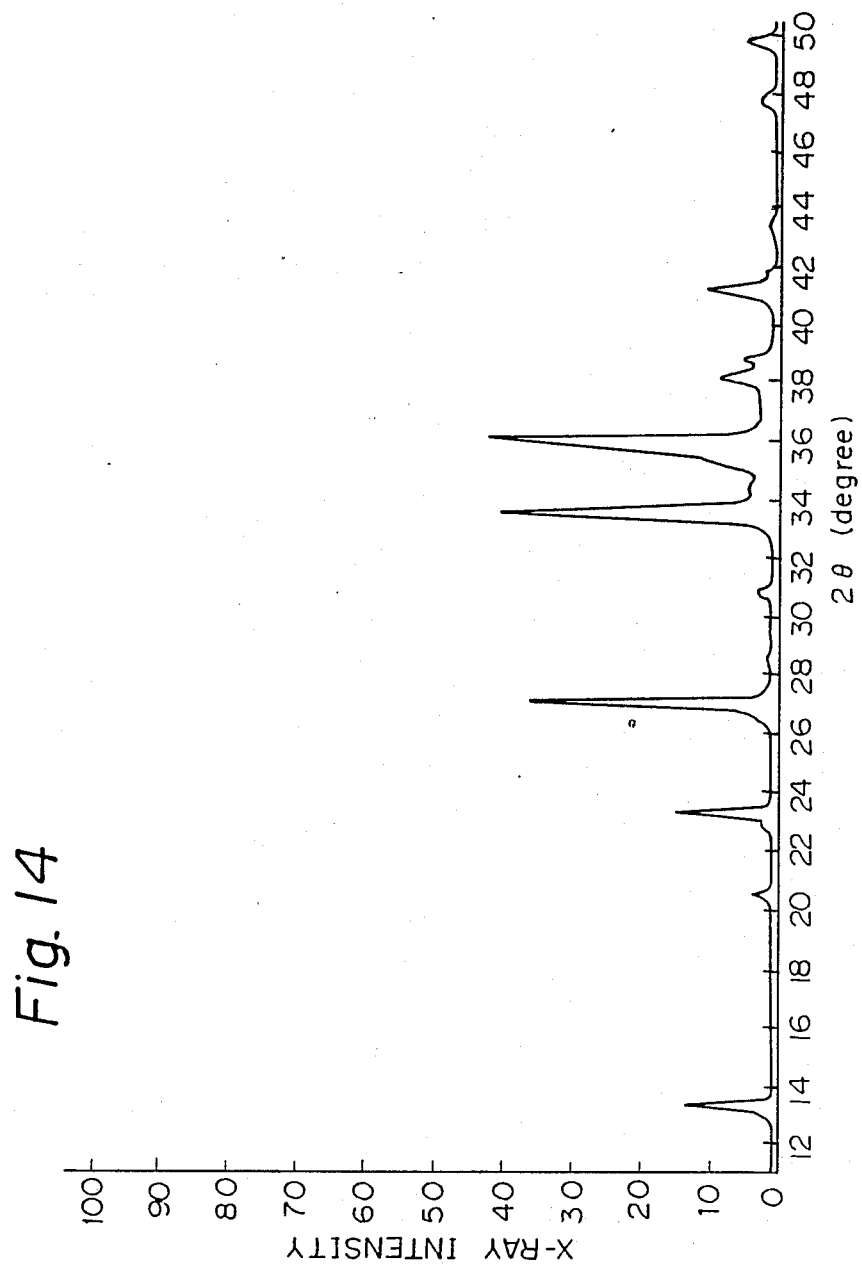

The obtained polyaluminosilazane was heated in an ammonia atmosphere while elevating the temperature to 1000° C. at a rate of 10° C./min, and heat treatment was carried out at 1000° C. for 1 hour to obtain a black solid in a yield of 89% by weight. From the results of the elementary analysis, it was confirmed that the obtained ceramics had a composition comprising 46.3% by weight of Si, 4.32% by weight of Al, 14.1% by weight of O, 28.8% by weight of N and 2.24% by weight of C. The solid was further heated in a nitrogen atmosphere while elevating the temperature to 1700° C. at a rate of 100° C./min, and heat treatment was carried out 1700° C. for 1 hour to obtain a grayish white solid. When the powder X-ray diffractometry of the obtained substance was carried out, as shown in FIG. 14, there were observed a (100) diffraction line of $\beta$-Si$_3$N$_4$ at $2\theta=13.4°$, a (110) diffraction line of $\beta$-Si$_3$N$_4$ at $2\theta=27.0°$, a (101) diffraction line of $\beta$-Si$_3$N$_4$ at $2\theta=33.6°$, a (210) diffraction line of $\beta$-Si$_3$N$_4$ at $2\theta=36.0°$, a (201) diffraction line of $\beta$-Si$_3$N$_4$ at $2\theta=41.4°$, a (220) diffraction line of $\beta$-Si$_3$N$_4$ at $2\theta=47.7°$, a (310) diffraction line of $\beta$-Si$_3$N$_4$ at $2\theta=49.8°$, a (101) diffraction line of $\alpha$-Si$_3$N$_4$ at $2\theta=20.5°$, a (110) diffraction line of $\alpha$-Si$_3$N$_4$ at $2\theta=22.9°$, a (201) diffraction line of $\alpha$-Si$_3$N$_4$ at $2\theta=30.9°$, a (102) diffraction line of $\alpha$-Si$_3$N$_4$ at $2\theta=34.4°$, a (210) diffraction line of $\alpha$-Si$_3$N$_4$ at $2\theta=35.2°$, a (211) diffraction line of $\alpha$-Si$_3$N$_4$ at $2\theta=38.8°$ and a (301) diffraction line of $\alpha$-Si$_3$N$_4$ at $2\theta=43.4°$. Furthermore, there were observed a (002) diffraction line of SiC(4H) at $2\theta=35.6°$ and a (101) diffraction line of SiC(4H) at $2\theta=38.1°$. Each of the diffraction lines of $\beta$-Si$_3$N$_4$ shifted to the lower angle side. For example, the (301) diffraction line shifted by $2\theta=0.12$ to the lower angle side. Since the lattice constant of the product was different from that of conventional $\beta$-Si$_3$N$_4$, it is presumed that the product was a composite ceramics composed of $\beta$-Si$_3$N$_4$, $\alpha$-Si$_3$N$_4$, SiC(4H) and $\beta$-sialon.

Example 9 [Production (3) of Polyaluminosilazane]

A condenser, a serum cap and a magnetic stirrer were attached to a four-necked flask having an inner volume of 200 ml, and the inner atmosphere of the reaction vessel was replaced with dry nitrogen. Then, 0.45 g (2.203 millimoles) of aluminum tri-isopropoxide was charged in the four-necked flask and 30 ml of an o-xylene solution of polymethyl(hydro)silazane obtained in Example 3 (the polymethyl(hydro)silazane concentration was 20.4 g/l) was added by using a syringe with stirring. Refluxing reaction was carried out at 130° C. for 48 hours in a nitrogen atmosphere. The colorless reaction solution was changed to a light yellow solution.

Figure 15:
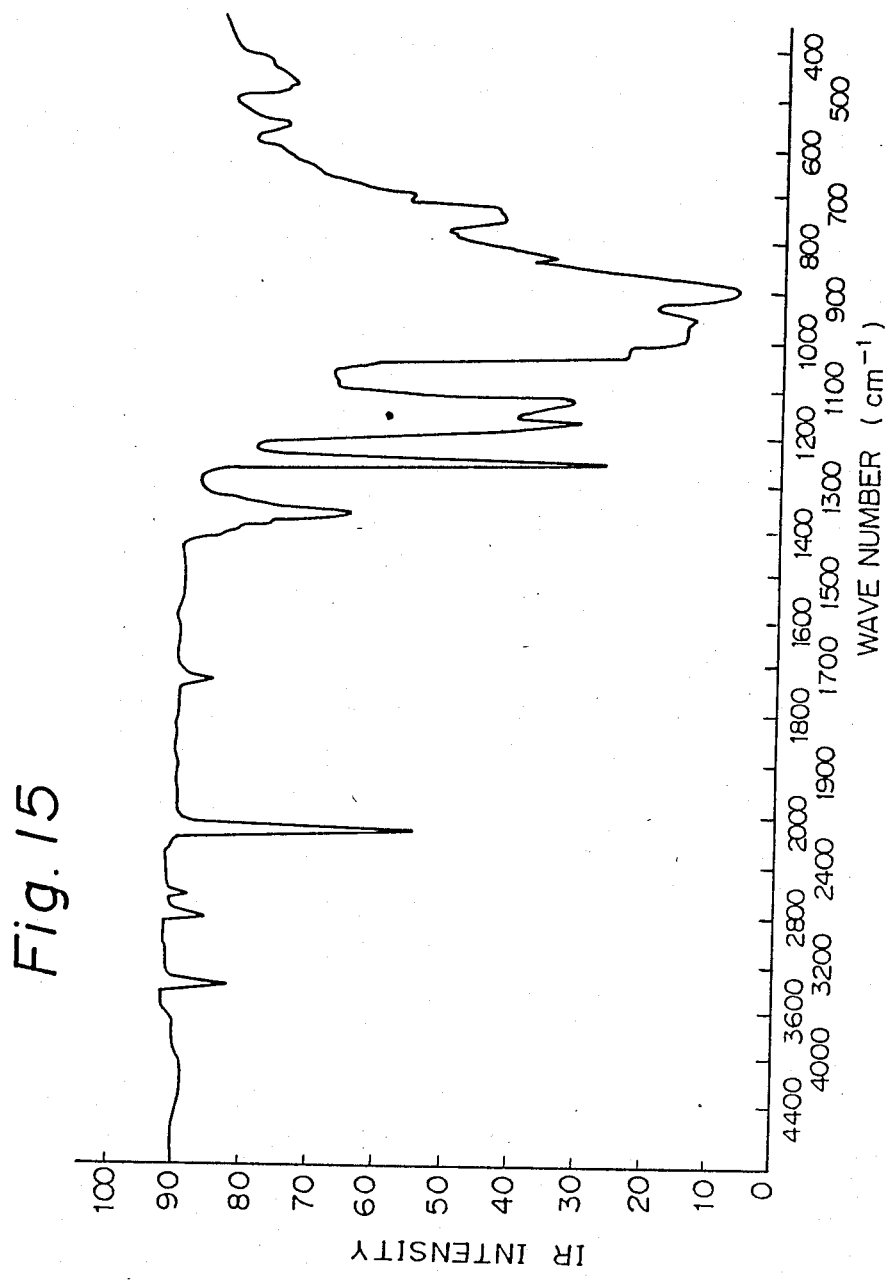
FIG. 15 is an IR spectrum of the polyalumino-silazane in Example 9.

When the IR spectrum (dry o-xylene) of the reaction solution was measured (FIG. 15), it was confirmed that about 5% of the Si—H bond and about 25% of the N—H bond in the polymethyl(hydro)silazane disappeared. From the results of the elementary analysis, it was confirmed that the polymer had a composition comprising 35.8% by weight of Si, 4.61% by weight of Al, 17.5% by weight of N, 8.7% by weight of O, 26.6% by weight of C and 6.1% by weight of H. The polymer obtained by removing the solvent by distillation under reduced pressure was heated while elevating the temperature to 1000° C. at a rate of 10° C./min and calcination was carried out at 1000° C. for 1 hour to obtain a black solid in a yield of 62% by weight.

Example 10 [Production (1) of Polyzirconosilazane]

A mixture of 0.2152 g (0.6569 millimole) of zirconium isopropoxide and 3.5 ml of dry o-xylene was added to 500 ml of a solution of the perhydropolysilazane (IR spectrum 3340 cm$^{-1}$ ($\epsilon=0.694$ g/l$^{-1}$cm$^{-1}$), 2160 $\epsilon=3.38$); number average molecular weight 1080) obtained in a manner similar to that in Example 1 in dry o-xylene (the concentration of the perhydropolysilazane was 28.94 g/l) in a nitrogen atmosphere. When this mixed solution was reacted at 90° C. with stirring in a nitrogen atmosphere, a light yellow solution was obtained. The reaction solution was cooled to room temperature and transferred into a graduated flask having a volume of 10 ml, and the solution was diluted to the mark with dry o-xylene.

Figure 16:
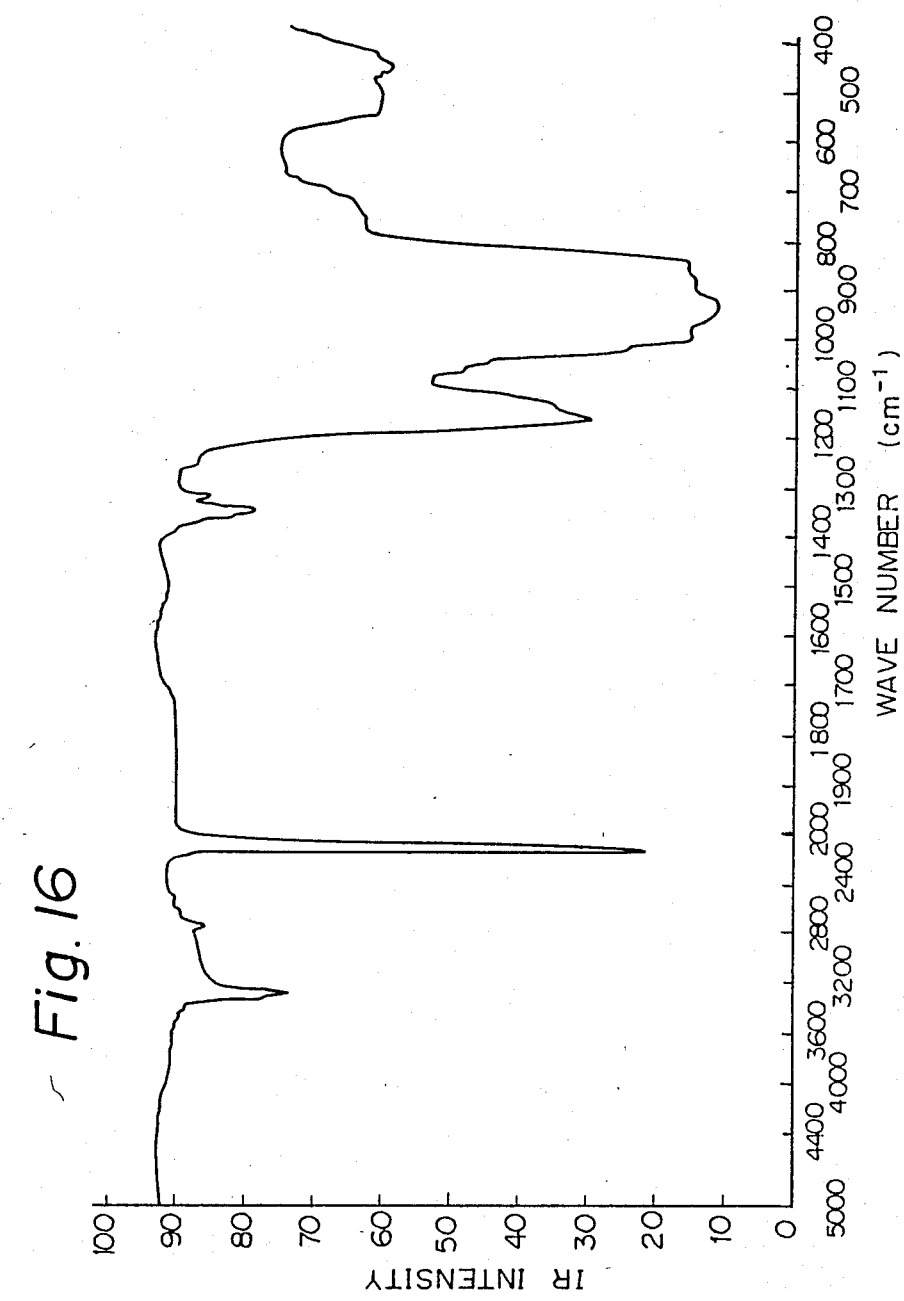
FIG. 16 is an IR spectrum of the polyzircono-silazane in Example 10.

The IR spectrum (dry o-xylene) of this reaction solution is shown in FIG. 16. The apparent absorptivity $\epsilon$ (1g$^{-1}$cm$^{-1}$) at 3350 cm$^{-1}$ was reduced to 0.419. By comparison with the calibration curve of the perhydropolysilazane prepared in advance, it was found that the concentration to the absorption (3350 cm$^{-1}$) due to NH corresponded to 8.73 g/l. Namely, it was confirmed that about 40% of the N—H bond in the perhydropolysilazane disappeared as the result of the reaction with zirconium tetra-isopropoxide. In addition to the absorptions at 3350 and 2170 cm$^{-1}$, there were observed adsorptions at 1365 and 1335 cm$^{-1}$ [$\delta$(CH$_3$)$_2$CH—], 1170 cm$^{-1}$ [$\gamma$(C—O)Zr] and 930 cm$^{-1}$, [$\gamma$ClOZr, $\gamma$(C—O)Zr].

Example 11 [Production (2) of Polyzirconosilazane]

A condenser, a serum cap, a thermometer and a magnetic stirrer were attached to a four-necked flask having an inner volume of 100 ml, and the inner atmosphere of the reaction vessel was replaced with dry nitrogen and 63.4 g of a benzene solution of the perhydropolysilazane used in Example 10 (the perhydro-polysilazane concentration was 4.45% by weight) was charged into the four-necked flask. A solution of 4.00 g (12.2 millimoles) of zirconium tetraisopropoxide in 6.0 ml of dry benzene was added to the above reaction by using a syringe with stirring. Reaction was carried out under reflux.

After termination of the reaction, the reaction solution was subjected to GPC separation to obtain a polyhydrozirconosilazane in the form of a light yellow solid.

The number average molecular weight of the formed polymer was 2100 as determined by the cryoscopic method using dry benzene as the solvent. From the results of the elementary analysis, it was confirmed that the polymer had a composition comprising 34.0% by weight of Si, 18.6% by weight of Zr, 13.0% by weight of N, 13.2% by weight of O, 14.4% by weight of C and 5.1% by weight of H.

An IR spectrum (dry benzene) similar to that of the product obtained in Example 10 was observed.

Figure 17:
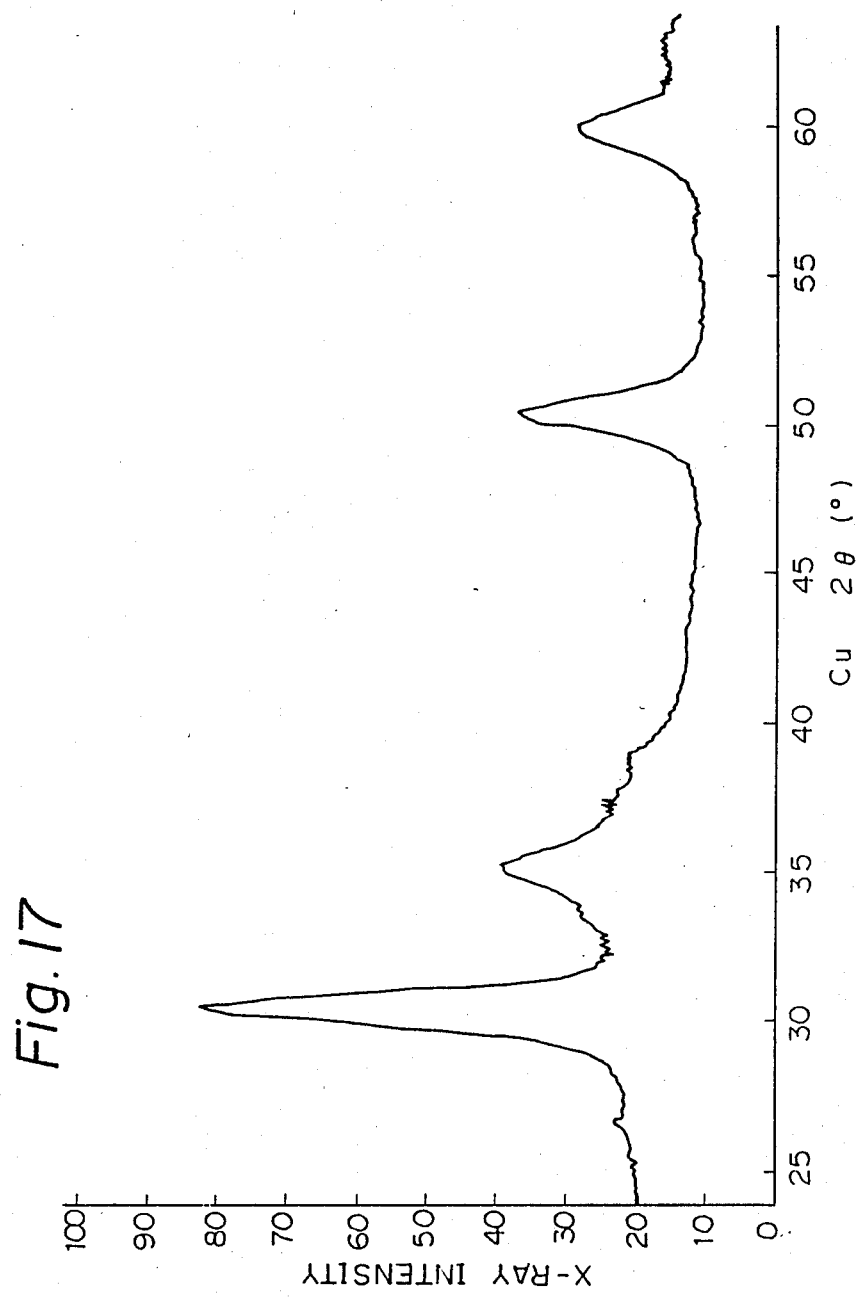
FIG. 17 is a powder X-ray diffraction diagram of the ceramics obtained by pyrolysis of the polyzirconosilazane prepared in Example 11.

When the so-obtained polymer was pyrolized at 1350° C. in a nitrogen atmosphere, a black solid was obtained in a yield of 78% by weight. When the X-ray powder diffractometry of this substance was carried out, a diffraction pattern of an amorphous ZrO$_2$ phase was observed as shown in FIG. 17. It was confirmed that when the perhydropolysilazane was calcined under the same conditions as described above, X-ray crystallographically crystalline silicon nitride was formed. When the polyhydrozirconosilazane was used as the precursor, the amorphous state could be retained in silicon nitride even at higher temperatures because of formation of the amorphous ZrO$_2$ phase.

Example 12 [Production (3) of Polyzirconosilazane]

A condenser, a serum cap, a thermometer and a magnetic stirrer were attached to a four-necked flask having an inner volume of 50 ml. The inner atmosphere of the reaction vessel was replaced with dry nitrogen and 0.733 g of the polymethyl(hydro)silazane synthesized in Example 3 and 25 ml of dry o-xylene were charged into the reaction vessel, and 1.14 g (3.47 millimoles) of zirconium tetra-isopropoxide was added to the mixture with stirring. Reaction was carried out at 130° to 135° C. After termination of the reaction, the reaction solution was cooled to room temperature and transferred to a graduated flask having a volume of 25 ml, and the reaction solution was diluted to the mark with dry o-xylene. The mixture was stirred, and the IR spectrum was measured.

Figure 18:
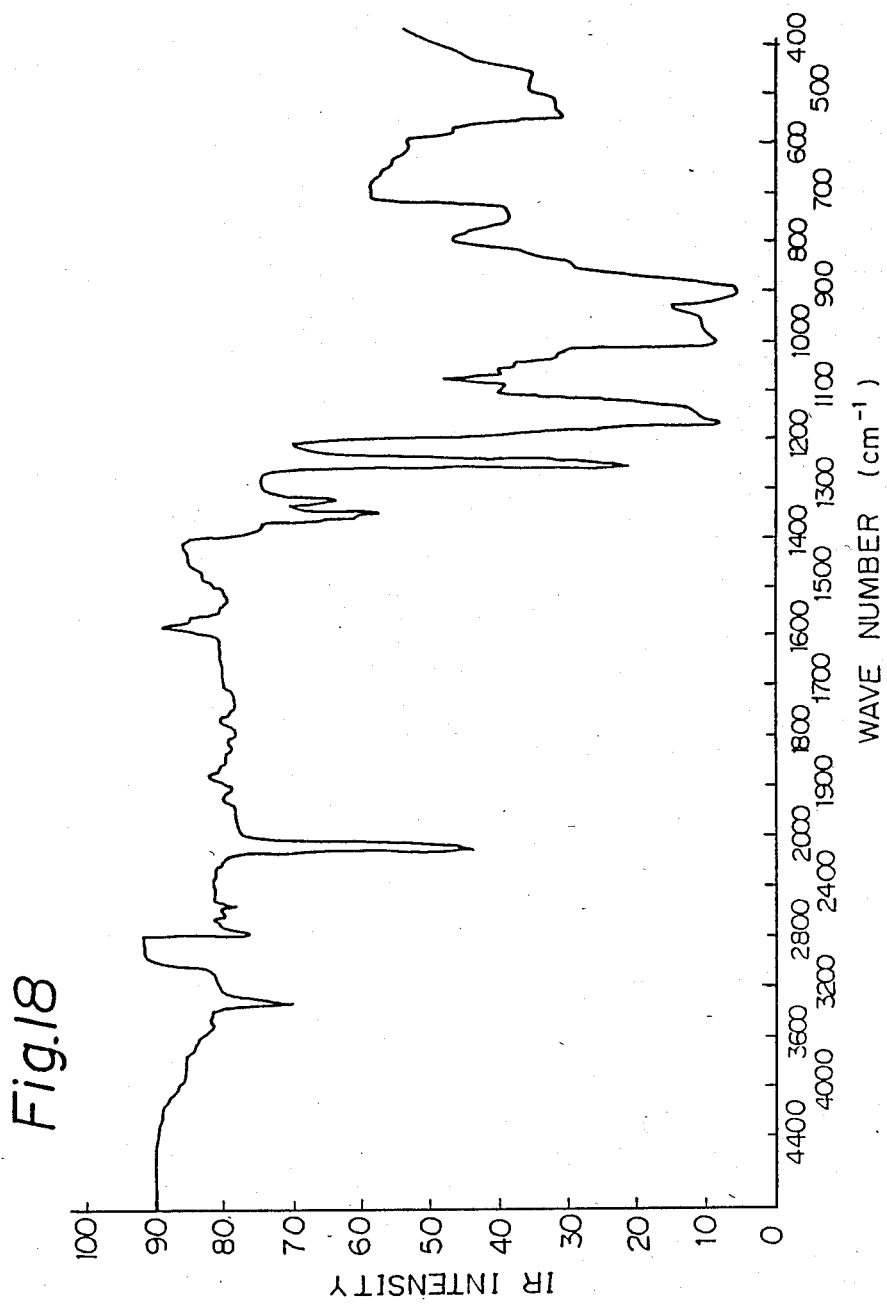
FIG. 18 is an IR spectrum of the polyzirconosilazane in Example 12.

As shown in FIG. 18, the apparent absorptivities $\epsilon$ ($1g^{-1}cm^{-1}$) at 3380 and 2120 $cm^{-1}$ were reduced to 0.193 and 0.654, respectively. By the comparison with the calibration curve of the polymethyl(hydro)silazane (synthesized in Example 3) prepared in advance, it was found that the concentration to the absorption (3380 $cm^{-1}$) due to NH corresponded to 22.7 g/l and the concentration to the absorption (2120 $cm^{-1}$) due to SiH corresponded to 23.3 g/l. Namely, it was confirmed that 22% of the N-H bond and 20% of the Si-H bond in the polymethyl(hydro)silazane disappeared as the result of the reaction with zirconium tetra-isopropoxide. In addition to the absorptions at 3380 and 2120 $cm^{-1}$, there were observed absorptions at 1360 and 1340 $cm^{-1}$ [$\delta(CH_3)_2CH-$] and 1170 and 1000 $cm^{-1}$ [$\gamma(C-O)Zr$].

When the reaction solution was subjected to GPC separation, a light yellow solid was obtained.

The number average molecular weight of the formed polymethylzirconosilazane was 1750 as determined by the cryoscopic method.

From the results of the elementary analysis, it was confirmed that the obtained polymer had a composition comprising 28.0% by weight of Si, 14.6% by weight of Zr, 13.5% by weight of N, 9.0% by weight of O, 27,5% by weight of C and 5.4% by weight of H.

We claim:

1. A novel polymetalosilazane having a metal/silicon atomic ratio of 0.001 to 3 and a number average molecular weight of about 200 to about 500,000, which is obtained by reacting a polysilazane having a number average molecular weight of about 100 to about 50,000, which has a main skeleton consisting substantially of units represented by the following general formula (I):

$$\left(\begin{array}{c} R^1 \\ | \\ -Si-N- \\ | \quad | \\ R^2 \quad R^3 \end{array}\right) \quad (I)$$

wherein each $R^1$, $R^2$ and $R^3$ is independently selected from the group consisting of a hydrogen atom, an alkyl group, an alkenyl group, a cycloalkyl group, an aryl group, a group other than the above-mentioned groups in which the atom bonded directly to the silicon atom is a carbon atom, an alkylsilyl group, an alkylamino group and an alkoxy group, with the proviso that at least one of $R^1$, $R^2$ and $R^3$ is a hydrogen atom,
with a metal alkoxide represented by the following general formula (II):

$$M(OR^4)_n \quad (II)$$

wherein M stands for at least one metal selected from the group consisting of metals of groups IIA and III through V of the Periodic Table, $R^4$'s which may be the same or different stand for a hydrogen atom or an alkyl group having 1 to 20 carbon atoms or aryl group, with the proviso that at least one of $R^4$'s is the above-mentioned alkyl group or aryl group, and n stands for the valency of the metal M.

2. A polymetalosilazane according to claim 1, wherein each $R^1$, $R^2$ and $R^3$ in said formula (I) is independently selected from the group consisting of a hydrogen atom, an alkyl group having 1 to 5 carbon atoms, an alkenyl group having 2 to 6 carbon atoms, a cycloalkyl group having 5 to 7 carbon atoms, an aryl group, an alkylsilyl group having 1 to 4 carbon atoms, an alkyl-amino group having 1 to 5 carbon atoms, and an alkoxy group having 1 to 5 carbon atoms, with the proviso that at least one of $R^1$, $R^2$ and $R^3$ is a hydrogen atom.

3. A polymetalosilazane according to claim 2, wherein each $R^1$, $R^2$ and $R^3$ in said formula (I) is independently selected from the a group consisting of a hydrogen atom, and methyl, ethyl, vinyl, allyl, methylamino, ethylamino, methoxy and ethoxy groups, with the proviso that at least one of $R^1$, $R^2$ and $R^3$ is a hydrogen atom.

4. A polymetalosilazane according to claim 1, wherein one of $R^1$ and $R^2$ is a hydrogen atom.

5. A polymetalosilazane according to claim 4, wherein said polysilazane is represented by the following composition formula:

$$(R^2SiHNH)_x[R^2SiH)_{1.5}N]_{1-x}$$

where $0.4 < x < 1$.

6. A polymetalosilazane according to claim 1, wherein each of $R^1$, $R^2$ and $R^3$ is a hydrogen atom.

7. A polymetalosilazane according to claim 6, wherein said polysilazane is represented the following composition formula:

$$(SiH_2NH)_{\overline{a}} \quad (SiH_2N)_{\overline{b}} \quad (SiH_3)_{\overline{c}}$$

where $a + b + c = 1$.

8. A polymetalosilazane according to claim 1, wherein M in said formula (II) stands for at least one metal selected from the group consisting of the groups III and IV of the Periodic Table.

9. A polymetalosilazane according to claim 8, wherein M in said formula (II) stands for at least one metal selected from the group consisting of Ti, Al and Zr.

10. A polymetalosilazane according to claim 8, wherein M in said formula (II) stands for at least one metal selected from the group consisting of B and Y.

11. A polymetalosilazane according to claim 1, wherein the $R^4$'s in said formula (II) may be the same or different and are selected from the group consisting of a hydrogen atom, an alkyl group having 1 to 10 carbon atoms, an aryl group having 6 to 10 carbon atoms, with the proviso that at least one $R^4$ is one of the above-mentioned alkyl and aryl groups.

12. A polymetalosilazane according to claim 11, wherein the $R^4$'s in said formula (II) may be the same or different and are selected from the group consisting of a hydrogen atom, methyl, ethyl, n-propyl, i-propyl, n-butyl, i-butyl, t-butyl, phenyl, benzyl and tolyl groups, with the proviso that at least one $R^4$ is not a hydrogen atom.

13. A polymetalosilazane according to claim 1 wherein said polymetalosilazane has a number average molecular weight of about 400 to 300,000.

14. A polymetalosilazane according to claim 1, wherein the metal/silicon atomic ratio of about 0.001 to 2.5.

15. A polymetalosilazane according to claim 1, wherein said metal/silicon atomic ratio of 0.01 to 2.0.

16. A process for the preparation of a polymetalo-silazane, which comprises reacting a polysilazane having a number average molecular weight of about 100 to about 50,000, which has a skeleton consisting substantially of units represented by the following general formula (I):

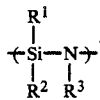
(I)

wherein the $R^1$, $R^2$ and $R^3$ is independently selected from the group consisting of a hydrogen atom, an alkyl group, an alkenyl group, a cycloalkyl group, an aryl group a atom other than the above-mentioned groups, in which the group bonded directly to the silicon atom is a carbon atom, an alkylsilyl group, an alkylamino group and an alkoxy group, with the proviso that at least one of $R^1$, $R^2$ and $R^3$ is a hydrogen atom, with a metal alkoxide represented by the following general formula (II):

$$M(OR^4)_n \qquad (II)$$

wherein M stands for at least one metal selected from the group consisting of metals of groups IIA and III through V of the Periodic Table, $R^4$'s which may be the same or different stand for a hydrogen atom or an alkyl group having 1 to 20 carbon atoms or aryl group, with the proviso that at least one of $R^4$'s is the above-mentioned alkyl group or aryl group, and n stands for the valency of M, to obtain a novel polymetalosilazane having a metal/silicon atomic ratio of from 0.001 to 3 and a number average molecular weight of about 200 to about 500,000.

17. A process according to claim 16, wherein each $R^1$, $R^2$ and $R^3$ in said formula (I) is independently selected from the group consisting of a hydrogen atom, an alkyl group having 1 to 5 carbon atoms, an alkenyl group having 2 to 6 carbon atoms, a cycloalkyl group having 5 to 7 carbon atoms, an aryl group, an alkylsilyl group having 1 to 4 carbon atoms, an alkylamino group having 1 to 5 carbon atoms, and an alkoxy group having 1 to 5 carbon atoms, with the proviso that at least one of $R^1$, $R^2$ and $R^3$ is a hydrogen atom.

18. A process according to claim 17, wherein $R^1$, $R^2$ and $R^3$ in said formula (I) independently stand for one of the group consisting of a hydrogen atom, and methyl, ethyl, vinyl, allyl, methylamino, ethylamino, methoxy and ethoxy groups, with the proviso that at least one of $R^1$, $R^2$ and $R^3$ is a hydrogen atom.

19. A process according to claim 16, wherein one of $R^1$ and $R^2$ is a hydrogen atom.

20. A process according to claim 19, wherein said polysilazane is represented by the following composition formula:

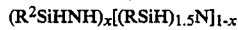

where $0.4 < x < 1$.

21. A process according to claim 16, wherein each of $R^1$, $R^2$ and $R^3$ is a hydrogen atom.

22. A process according to claim 19, wherein said polysilazane is represented by the following chemical formula:

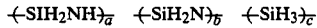

where $a+b+c=1$.

23. A process according to claim 16, wherein M in said formula (II) stand for at least one metal selected from the group consisting of the groups III and IV of the Periodic Table.

24. A process according to claim 23, wherein M in said formula (II) stand for at least one metal selected from the group consisting of Ti, Al and Zr.

25. A process according to claim 23, wherein M in said formula (II) stands for at least one metal selected from the group consisting of B and Y.

26. A process according to claim 16, wherein $R^4$'s in said formula (II) may be the same or different and stand for one of the group consisting of a hydrogen atom, an alkyl group having 1 to 10 carbon atoms and an aryl group having 6 to 10 carbon atoms, with the proviso that at least one of $R^4$'s is the above-mentioned alkyl group or aryl group.

27. A process according to claim 16 wherein $R^4$'s in said formula (II) may be the same or different and stand for a hydrogen atom, and methyl, ethyl, n-propyl, i-propyl n-butyl, i-henol, t-butyl, phenyl, benzyl and tolyl groups, with the proviso that at least one of $R^4$'s is not a hydrogen atom.

28. A process according to claim 16, wherein said mixing ratio of polysilazane/metal alkoxide is such that the M/Si atomic ratio is from 0.01 to 5.

29. A process according to claim 28, wherein said mixing ratio of polysilazane/metal alkoxide is such that the M/Si atomic ratio is from 0.05 to 2.5.

* * * * *